United States Patent
Jeong et al.

(10) Patent No.: US 11,205,257 B2
(45) Date of Patent: Dec. 21, 2021

(54) METHOD AND APPARATUS FOR MEASURING VIDEO QUALITY BASED ON DETECTION OF CHANGE IN PERCEPTUALLY SENSITIVE REGION

(71) Applicant: ELECTRONICS AND TELECOMMUNICATIONS RESEARCH INSTITUTE, Daejeon (KR)

(72) Inventors: Se-Yoon Jeong, Daejeon (KR); Dae-Yeol Lee, Daejeon (KR); Seung-Hyun Cho, Daejeon (KR); Hyunsuk Ko, Daejeon (KR); Youn-Hee Kim, Daejeon (KR); Jong-Ho Kim, Daejeon (KR); Jin-Wuk Seok, Daejeon (KR); Joo-Young Lee, Daejeon (KR); Woong Lim, Daejeon (KR); Hui-Yong Kim, Daejeon (KR); Jin-Soo Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 16 days.

(21) Appl. No.: 16/697,585

(22) Filed: Nov. 27, 2019

(65) Prior Publication Data
US 2020/0175668 A1    Jun. 4, 2020

(30) Foreign Application Priority Data

Nov. 29, 2018  (KR) .................. 10-2018-0151341
Nov. 27, 2019  (KR) .................. 10-2019-0153898

(51) Int. Cl.
*H04B 1/66*    (2006.01)
*H04N 7/12*    (2006.01)
(Continued)

(52) U.S. Cl.
CPC .............. *G06T 7/0002* (2013.01); *G06T 7/13* (2017.01); *H04N 17/00* (2013.01);
(Continued)

(58) Field of Classification Search
CPC .................... G06T 7/0002; G06T 7/13; G06T 2207/30168
See application file for complete search history.

(56) References Cited

U.S. PATENT DOCUMENTS

| | | | | |
|---|---|---|---|---|
| 7,715,592 B1* | 5/2010 | Hollier | ................. | H04N 17/004 382/112 |
| 8,422,795 B2* | 4/2013 | Pahalawatta | .......... | G06T 7/0002 382/218 |

(Continued)

FOREIGN PATENT DOCUMENTS

| KR | 10-0641200 B1 | 11/2006 |
|---|---|---|
| KR | 10-1316699 B1 | 10/2013 |
| KR | 10-1327709 B1 | 11/2013 |

*Primary Examiner* — Fabio S Lima
(74) *Attorney, Agent, or Firm* — NSIP Law

(57) ABSTRACT

Disclosed herein are a method and apparatus for measuring video quality based on a perceptually sensitive region. The quality of video may be measured based on a perceptually sensitive region and a change in the perceptually sensitive region. The perceptually sensitive region includes a spatial perceptually sensitive region, a temporal perceptually sensitive region, and a spatio-temporal perceptually sensitive region. Perceptual weights are applied to a detected perceptually sensitive region and a change in the detected perceptually sensitive region. Distortion is calculated based on the perceptually sensitive region and the change in the perceptually sensitive region, and a result of quality measurement for a video is generated based on the calculated distortion.

17 Claims, 20 Drawing Sheets

(51) Int. Cl.
  *H04N 11/02* (2006.01)
  *H04N 11/04* (2006.01)
  *G06T 7/00* (2017.01)
  *G06T 7/13* (2017.01)
  *H04N 17/00* (2006.01)

(52) U.S. Cl.
  CPC ............... *G06T 2207/10016* (2013.01); *G06T 2207/20084* (2013.01); *G06T 2207/30168* (2013.01)

(56) References Cited

U.S. PATENT DOCUMENTS

| | | | |
|---|---|---|---|
| 10,075,635 B2 | 9/2018 | Seok et al. | |
| 10,127,646 B2 | 11/2018 | Oh et al. | |
| 2002/0031277 A1* | 3/2002 | Lubin | G06T 5/50 382/254 |
| 2006/0152585 A1* | 7/2006 | Bourret | H04N 17/004 348/180 |
| 2006/0276983 A1* | 12/2006 | Okamoto | H04N 17/04 702/69 |
| 2011/0038548 A1* | 2/2011 | Rezazadeh | G06K 9/6201 382/199 |
| 2011/0255589 A1* | 10/2011 | Saunders | H04N 19/122 375/240.01 |
| 2012/0020415 A1* | 1/2012 | Yang | H04N 19/61 375/240.27 |
| 2014/0301649 A1* | 10/2014 | Zhang | H04N 19/172 382/199 |
| 2016/0212432 A1* | 7/2016 | Wang | H04N 19/154 |
| 2017/0289539 A1* | 10/2017 | Callet | G06K 9/00711 |
| 2018/0068195 A1* | 3/2018 | Kolarov | G06T 7/80 |
| 2020/0380290 A1* | 12/2020 | Sodhani | G06K 9/4676 |

\* cited by examiner

METHOD AND APPARATUS FOR MEASURING VIDEO QUALITY BASED ON DETECTION OF CHANGE IN PERCEPTUALLY SENSITIVE REGION

CROSS REFERENCE TO RELATED APPLICATIONS

This application claims the benefit of Korean Patent Application Nos. 10-2018-0151341, filed Nov. 29, 2018 and 10-2019-0153898, filed Nov. 27, 2019, which are hereby incorporated by reference in their entireties into this application.

BACKGROUND OF THE INVENTION

1. Technical Field

The following embodiments relate generally to a method and apparatus for measuring video quality, and more particularly, to a method and apparatus for measuring video quality based on the detection of a change in a perceptually sensitive region.

2. Description of the Related Art

In video processing or video compression fields, an index indicating the quality of a video is required in order to verify the performance of technology that is the target to be developed or to realize optimization of the technology.

As the index more accurately reflects subjective image quality performance, the technology may provide better subjective image quality performance.

The measurement of subjective video quality is a method for obtaining a quality measurement value for a video by statistically processing individual video quality assessment values acquired through video quality assessment experiments in which multiple assessors participate. The temporal and economic costs of such subjective video quality measurement are considered to be relatively high.

A method for automatically measuring video quality can measure video quality at relatively low temporal and economic costs. The purpose of the automatic video-quality measurement method is to replace subjective image (video) quality assessment.

For such replacement to be possible, the automatic video-quality measurement method must provide high measurement reliability. Typically, measurement reliability may be evaluated through a Pearson's Correlation Coefficient (PCC), a Spearman's Rank Correlation Coefficient (SRCC), or the like.

SUMMARY OF THE INVENTION

An embodiment is intended to provide a method and apparatus for measuring the quality of a video based on a perceptually sensitive region.

An embodiment is intended to provide a method and apparatus for measuring the quality of a video based on a change in a perceptually sensitive region.

An embodiment is intended to provide a method and apparatus for deriving the feature information of an image using perceptual weights.

In accordance with an aspect, there is provided a video-processing apparatus, including a communication unit for receiving a reference video and a comparison video; and a processing unit for generating a result of video quality measurement for the comparison video, wherein the processing unit calculates distortion using feature information of the reference video, feature information of the comparison video, a perceptually sensitive region of the reference video, a perceptually sensitive region of the comparison video, and a change from the perceptually sensitive region of the reference video to the perceptually sensitive region of the comparison video, and generates the result of the video quality measurement based on the distortion.

The feature information of the reference video may include one or more of spatial feature information of the reference video, temporal feature information of the reference video, and spatio-temporal feature information of the reference video.

The feature information of the comparison video may include one or more of spatial feature information of the comparison video, temporal feature information of the comparison video, and spatio-temporal feature information of the comparison video.

The processing unit may extract the spatio-temporal feature information from a spatio-temporal slice of an input video.

The input video may include one or more of the reference video and the comparison video.

The spatio-temporal slice may have a structure into which a Group of Pictures (GOP) of the input video is spatially divided.

The processing unit may detect horizontal features and vertical features of the spatial feature information in each image of an input video.

The processing unit may detect features in a direction other than a horizontal direction and a vertical direction in the image.

The processing unit may derive a region in which perceptual sensitivity is high from the image using an edge detection method.

The edge detection method may be a method using a Sobel operation.

The horizontal features and the vertical features may indicate a horizontal-vertical edge map.

The features in the direction other than the horizontal direction and the vertical direction may indicate an edge map from which information about a horizontal edge and a vertical edge is excluded.

The processing unit may update the horizontal-vertical edge map using a first perceptual weight.

The processing unit may update the edge map from which the information about the horizontal edge and the vertical edge is excluded using a second perceptual weight.

The first perceptual weight and the second perceptual weight may reflect a change in a spatial perceptually sensitive region.

The perceptually sensitive region of the reference video may include one or more of a spatial perceptually sensitive region of the reference video, a temporal perceptually sensitive region of the reference video, and a spatio-temporal perceptually sensitive region of the reference video.

The perceptually sensitive region of the comparison video may include one or more of a spatial perceptually sensitive region of the comparison video, a temporal perceptually sensitive region of the comparison video, and a spatio-temporal perceptually sensitive region of the comparison video.

The processing unit may generate a spatial randomness map by calculating spatial randomness values of pixels or first blocks in each image of an input video.

The input video may be the reference video or the comparison video.

The processing unit may generate a smoothness map by calculating background smoothness values of second blocks in each image of the input video.

The change may be a difference between the perceptually sensitive region of the reference video and the perceptually sensitive region of the comparison video.

The distortion may include one or more of spatial distortion, temporal distortion, and spatio-temporal distortion.

The processing unit may extract representative spatial information of the reference video using spatial feature information of the reference video, a spatial perceptually sensitive region of the reference video, and a change in the spatial perceptually sensitive region.

The processing unit may extract representative spatial information of the comparison video using spatial feature information of the comparison video, a spatial perceptually sensitive region of the comparison video, and a change in the spatial perceptually sensitive region.

The processing unit may calculate the spatial distortion.

The spatial distortion may be a difference between the representative spatial information of the reference video and the representative spatial information of the comparison video.

The change in the spatial perceptually sensitive region may be a change from the spatial perceptually sensitive region of the reference video to the spatial perceptually sensitive region of the comparison video.

The processing unit may generate combined spatial information of the reference video by combining the spatial feature information of the reference video, the spatial perceptually sensitive region of the reference video, and the change in the spatial perceptually sensitive region.

The processing unit may extract representative spatial information of each image of the reference video from the combined spatial information.

The processing unit may extract the representative spatial information of the reference video from the representative spatial information of each image of the reference video.

The processing unit may extract representative temporal information of the reference video using temporal feature information of the reference video, a temporal perceptually sensitive region of the reference video, and a change in the temporal perceptually sensitive region.

The processing unit may extract the representative temporal information of the comparison video using temporal feature information of the comparison video, a temporal perceptually sensitive region of the comparison video, and a change in the temporal perceptually sensitive region.

The processing unit may calculate the temporal distortion.

The temporal distortion may be a difference between the representative temporal information of the reference video and the representative temporal information of the comparison video.

The change in the temporal perceptually sensitive region may be a change from a temporal perceptually sensitive region of the reference video to a temporal perceptually sensitive region of the comparison video.

The processing unit may generate combined temporal information of the reference video by combining the temporal feature information of the reference video, the temporal perceptually sensitive region of the reference video, and the change in the temporal perceptually sensitive region.

The processing unit may extract representative temporal information of each image of the reference video from the combined temporal information.

The processing unit may extract the representative temporal information of the reference video from the representative temporal information of each image of the reference video.

In accordance with another aspect, there is provided a video-processing method, including extracting feature information of a reference video; detecting a perceptually sensitive region of the reference video; extracting feature information of a comparison video; detecting a perceptually sensitive region of the comparison video; calculating a change from the perceptually sensitive region of the reference video to the perceptually sensitive region of the comparison video; calculating distortion using the feature information of the reference video, the feature information of the comparison video, the perceptually sensitive region of the reference video, the perceptually sensitive region of the comparison video, and the change; and generating a result of video quality measurement based on the distortion.

In accordance with a further aspect, there is provided a computer-readable storage medium storing a program for performing the video-processing method.

In accordance with yet another aspect, there is provided a video-processing apparatus, including a communication unit for receiving a reference video and a comparison video, and a processing unit for operating a deep neural network for perceptual quality measurement, wherein the processing unit detects a perceptually sensitive region of the reference video and a perceptually sensitive region of the comparison video and calculates a change from the perceptually sensitive region of the reference video to the perceptually sensitive region of the comparison video, wherein the perceptually sensitive region of the reference video, the perceptually sensitive region of the comparison video, and the change are input to the deep neural network for perceptual quality measurement, and wherein the deep neural network for perceptual quality measurement generates a result of measurement of video quality using the perceptually sensitive region of the reference video, the perceptually sensitive region of the comparison video, and the change.

DESCRIPTION OF THE PREFERRED EMBODIMENTS

Figure 1:
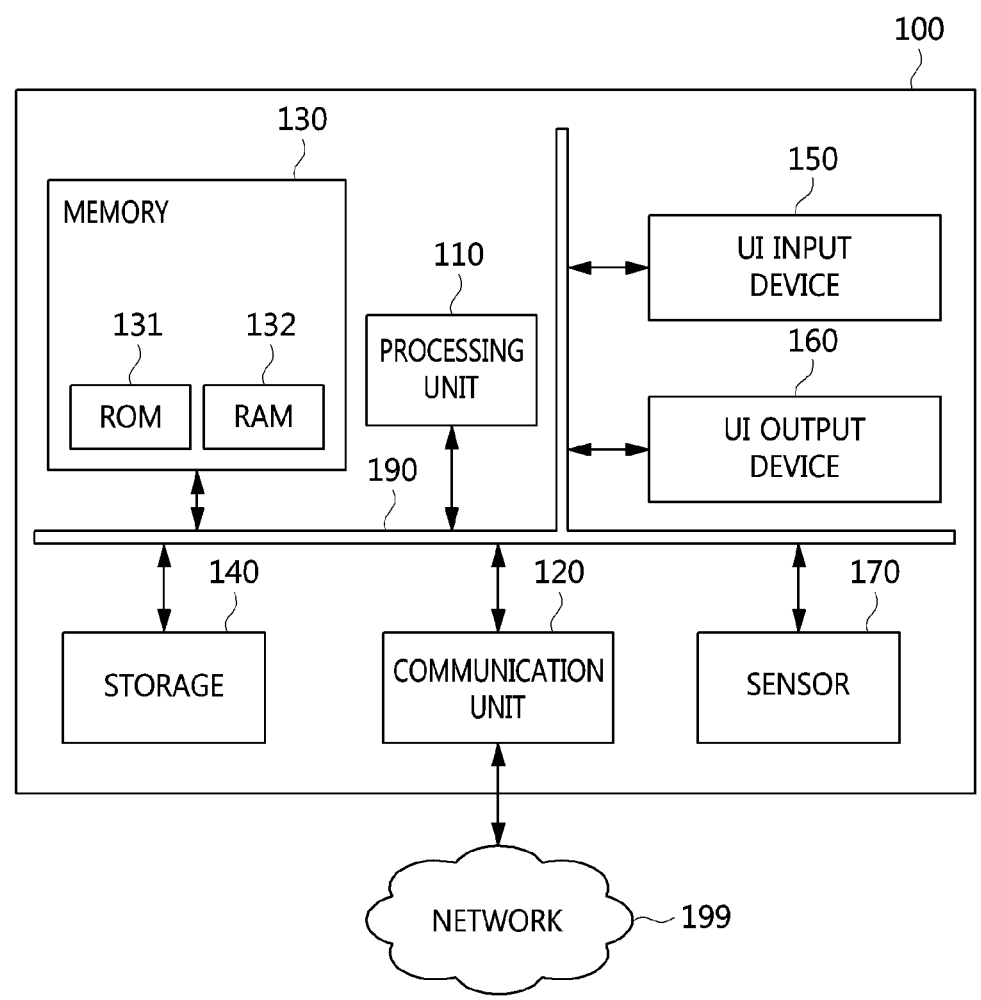
FIG. 1 illustrates a video-processing apparatus according to an embodiment.

Detailed descriptions of the following exemplary embodiments will be made with reference to the attached drawings illustrating specific embodiments as examples. These embodiments are fully described in detail so that those skilled in the art can practice the embodiments. It should be understood that various embodiments are different from each other, but they do not need to be mutually exclusive. For example, specific shapes, structures, and features described here in relation to an embodiment may be implemented in other embodiments without departing from the spirit and scope of the present disclosure. Further, it should be understood that the locations or arrangement of individual components in each disclosed embodiment can be changed without departing from the spirit and scope of the embodiment. Therefore, the detailed description, which will be made later, is not intended to be taken in a restrictive sense, and the scope of exemplary embodiments should be limited only by the scopes of the accompanying claims and equivalents thereof if the proper description thereof is made.

Similar reference numerals in the drawings are used to designate identical or similar functions in various aspects. The shapes, sizes, etc. of components in the drawings may be exaggerated to make the description clear.

The terms used in the embodiments are merely used to describe specific embodiments, and are not intended to limit the present disclosure. In the embodiments, a singular expression includes a plural expression unless a description to the contrary is specifically pointed out in context. In the present specification, it should be understood that the terms "comprises" and/or "comprising" are merely intended to indicate that components, steps, operations, and/or elements are present, and additional configurations are included in the scope of the practice of exemplary embodiments or the technical spirit of the exemplary embodiments, and are not intended to exclude the possibility that one or more other components, steps, operations, and/or elements will be present or added. It should be understood that "connected" or "coupled" refers not only to one component being directly connected or coupled with another component, but also to indirect coupling with another component through an intermediate component.

It will be understood that, although the terms "first" and "second" may be used herein to describe various components, these components should not be limited by these terms. These terms are only used to distinguish one component from other components. For instance, a first component discussed below could be termed a second component without departing from the scope of the disclosure. Similarly, a second component can also be termed a first component.

Also, the components present in the embodiments may be independently illustrated so as to indicate different characteristic functions, but this does not mean that each component is necessarily implemented as a separate hardware or software constituent unit. That is, respective components are merely separately listed for convenience of description. For example, at least two of the components may be integrated into a single component. Also, a single component may be separated into a plurality of components. Embodiments in which individual components are integrated or separated are also included in the scope of the disclosure without departing from the essential features of the disclosure.

Further, some components are not essential components for performing essential functions, but are merely optional components for improving functionality. The embodiments may be implemented to include only essential components required in order to implement the essence of the embodiments. For example, a structure from which optional components, such as a component used only to improve performance, are excluded may also be included in the scope of the disclosure.

Embodiments of the present disclosure are described with reference to the accompanying drawings in order to describe the present disclosure in detail so that those having ordinary knowledge in the technical field to which the present disclosure pertains can easily practice the present disclosure. In the following description of the present disclosure, detailed descriptions of known configurations or functions which are deemed to make the gist of the present disclosure obscure will be omitted.

Existing Full-Reference (FR) video quality indices, such as a Mean Squared Error (MSE), a Peak Signal-to-Noise Ratio (PSNR) or Structural Similarity (SSIM), are methods for measuring the difference between a reference video and a comparison video and are advantageous in that they are intuitive methods.

However, there are some cases where a large difference is present between measurement values based on these full-reference video quality indices and perceptual quality, and thus there is a disadvantage in that measurement reliability based on full-reference video quality indices is low in a comparison between images having different features.

Furthermore, when methods using full-reference quality indices are applied to a video, the result values of respective images of the video may be generated by measuring respective images of the video, and the average of the result values of the images may be the result value of the video. Therefore, when the full-reference video quality indices are applied to a video, the measurement reliability of full-reference video quality indices may be further deteriorated.

Various types of automatic video-quality measurement methods have been proposed, and, in particular, a Video Quality Model for Variable Frame Delay (VQM-VFD) has also been adopted as an international standard. However, since these methods do not provide sufficiently high reliability, they are not widely used.

The automatic video-quality measurement methods, such as those described above, do not effectively utilize visual perception characteristics. Therefore, the performance of an automatic video-quality measurement method may be greatly improved by effectively utilizing visual perception characteristics.

FIG. 1 illustrates a video-processing apparatus according to an embodiment.

A video-processing apparatus 100 may include at least some of a processing unit 110, a communication unit 120, memory 130, storage 140, and a bus 190. The components of the video-processing apparatus 100, such as the processing unit 110, the communication unit 120, the memory 130, and the storage 140, may communicate with each other through the bus 190.

The processing unit 110 may be a semiconductor device for executing processing instructions stored in the memory 130 or the storage 140. For example, the processing unit 110 may be at least one hardware processor.

The processing unit 110 may process tasks required for the operation of the video-processing apparatus 100. The processing unit 110 may execute code in the operations or steps of the processing unit 110, which will be described in connection with embodiments.

The processing unit 110 may generate, store, and output information to be described in the embodiments, which will be described later, and may perform operations at other steps to be performed by the video-processing apparatus 100.

The communication unit 120 may be connected to a network 199. The communication unit 120 may receive data or information required for the operation of the video-processing apparatus 100, and may transmit data or information required for the operation of the video-processing apparatus 100. The communication unit 120 may transmit data to an additional device and receive data from the additional device over the network 199. For example, the communication unit 120 may be a network chip or a port.

Each of the memory 130 and the storage 140 may be any of various types of volatile or nonvolatile storage media. For example, the memory 130 may include at least one of Read-Only Memory (ROM) 131 and Random Access Memory (RAM) 132. The storage 140 may include an embedded storage medium, such as RAM, flash memory, and a hard disk, and a removable storage medium, such as a memory card.

The functions or operations of the video-processing apparatus 100 may be performed when the processing unit 110 executes at least one program module. The memory 130 and/or the storage 140 may store at least one program module. The at least one program module may be configured to be executed by the processing unit 110.

At least some of the above-described components of the video-processing apparatus 100 may be at least one program module.

For example, units and neural networks, which will be described later, may be program modules that are executed by the processing unit 110.

The program modules may be included in the video-processing apparatus 100 in the form of an Operating System (OS), application modules, libraries, and other program modules, and may be physically stored in various known storage devices. Further, at least some of the program modules may be stored in a remote storage device that enables communication with the video-processing apparatus 100. Meanwhile, the program modules may include, but are not limited to, a routine, a subroutine, a program, an object, a component, and a data structure for performing specific operations or specific tasks according to an embodiment or for implementing specific abstract data types.

The video-processing apparatus 100 may further include a User Interface (UI) input device 150 and a UI output device 160. The UI input device 150 may receive user input required for the operation of the video-processing apparatus 100. The UI output device 160 may output information or data depending on the operation of the video-processing apparatus 100.

The video-processing apparatus 100 may further include a sensor 170. The sensor 170 may generate a video by continuously capturing images.

Hereinafter, the terms "image" and "frame" may be used to have the same meaning, and may be used interchangeably with each other.

Figure 2:
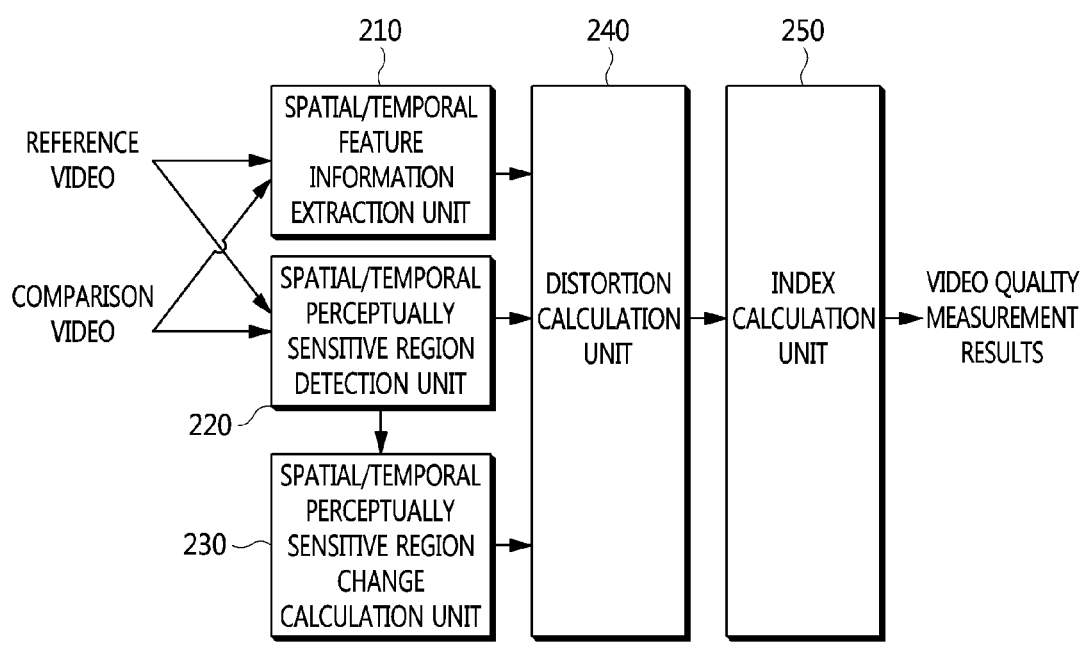
FIG. 2 illustrates a configuration for measuring video quality according to an embodiment.

FIG. 2 illustrates a configuration for measuring video quality according to an embodiment.

The processing unit 110 may include a spatial/temporal feature information extraction unit 210, a spatial/temporal perceptually sensitive region detection unit 220, a spatial/temporal perceptually sensitive region change calculation unit 230, a distortion calculation unit 240, and an index calculation unit 250.

The video-processing apparatus 100 may automatically measure the perceptual quality of a video. The video-processing apparatus 100 may detect a perceptually sensitive region in a video so as to provide high measurement reliability upon measuring the perceptual quality of the video, and may utilize the detected perceptually sensitive region for video quality measurement. Below, the term "video (or image) quality" may mean perceptual quality.

In subjective video quality assessment and measurement, each assessor may separately assess the quality of a reference video and the quality of a comparison video. The difference between an assessment value assigned to the quality of the reference video and an assessment value assigned to the quality of the comparison video by each assessor may be derived. A Mean Opinion Score (MOS) may be the average of differences between assessment values assigned by assessors.

In this case, each assessor may more intensively consider the video quality of a perceptually sensitive region when assessing the reference video, and may more intensively consider the video quality of a perceptually sensitive region when assessing the comparison video.

Generally, a perceptually sensitive region in the reference video may differ from a perceptually sensitive region in the comparison video.

Also, as in the case of a Double Stimulus Continuous Quality Scale (DSCQS) method, when video qualities are assessed for a pair of a reference video and an assessment video, changes in sensitive regions in the two videos may be further considered. In order to consider such perceptual features, in an embodiment, the spatial/temporal perceptually sensitive region detection unit 220 and the spatial/temporal perceptually sensitive region change calculation unit 230 may be introduced. By means of video quality measurement using the spatial/temporal perceptually sensitive region detection unit 220 and the spatial/temporal perceptually sensitive region change calculation unit 230, higher measurement reliability may be provided.

The functions and operations of the spatial/temporal feature information extraction unit 210, the spatial/temporal perceptually sensitive region detection unit 220, the spatial/temporal perceptually sensitive region change calculation unit 230, the distortion calculation unit 240, and the index calculation unit 250 will be described in detail later.

In embodiments, the term "spatial/temporal" may mean "spatial, temporal, and spatio-temporal" or "at least one of spatial, temporal, and spatio-temporal".

In embodiments, spatial features and temporal features may be combined into spatio-temporal features.

In embodiments, the term "spatial information" may be related to images of the video. In other words, the term "spatial information" may be related to images of the video, rather than the entire video. In an embodiment, the term "video" may be replaced with "image". For example, the term "reference video" may be replaced with "reference image of the reference video". The term "comparison video" may be replaced with "comparison image of the comparison video".

Figure 3:
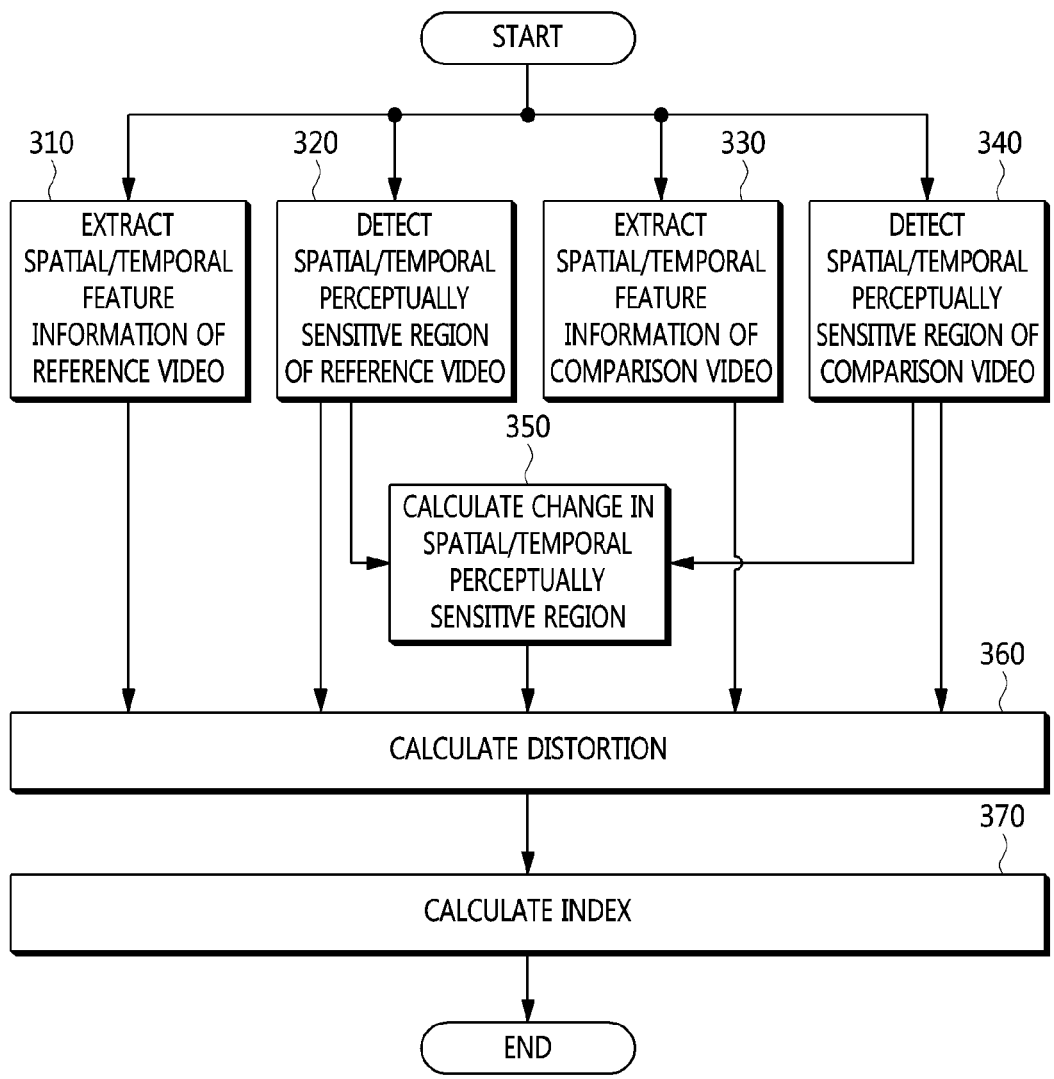
FIG. 3 is a flowchart of a video-quality measurement method according to an embodiment.

FIG. 3 is a flowchart of a video-quality measurement method according to an embodiment.

Before step 310, the communication unit 120 may receive a reference video and a comparison video. Alternatively, the communication unit 120 may receive any one of a reference video and a comparison video, and the sensor 170 may capture an image of the other.

At step 310, the spatial/temporal feature information extraction unit 210 may extract the spatial/temporal feature information of the reference video.

The spatial/temporal feature information may mean one or more of spatial feature information, temporal feature information, and spatio-temporal feature information. Further, the spatial/temporal feature information may be abbreviated as "feature information".

At step 320, the spatial/temporal perceptually sensitive region detection unit 220 may detect a spatial/temporal perceptually sensitive region of the reference video.

The spatial/temporal perceptually sensitive region may refer to one or more of a spatial perceptually sensitive region, a temporal perceptually sensitive region, and a spatio-temporal perceptually sensitive region. Also, the spatial/temporal perceptually sensitive region may be abbreviated as a perceptually sensitive region.

The spatial/temporal perceptually sensitive region detection unit 220 may distinguish a spatially/temporally less sensitive region from a spatially/temporally more sensitive region in the reference video.

For example, the spatially/temporally less sensitive region may be a region in which a spatial/temporal masking effect is great.

The spatial/temporal masking effect may mean one or more of a spatial masking effect, a temporal masking effect, and a spatio-temporal masking effect. Further, the spatial/temporal masking effect may be abbreviated as a masking effect.

In other words, the spatial/temporal perceptually sensitive region detection unit 220 may measure the sensitivity of each of the regions in the reference video.

At step 330, the spatial/temporal feature information extraction unit 210 may extract the spatial/temporal feature information of the comparison video.

At step 340, the spatial/temporal perceptually sensitive region detection unit 220 may detect a spatial/temporal perceptually sensitive region of the comparison video.

The spatial/temporal perceptually sensitive region detection unit 220 may distinguish a spatially/temporally less sensitive region from a spatially/temporally more sensitive region in the comparison video.

In other words, the spatial/temporal perceptually sensitive region detection unit 220 may measure the sensitivity of each of the regions in the comparison video.

At step 350, the spatial/temporal perceptually sensitive region change calculation unit 230 may calculate a change from the spatial/temporal perceptually sensitive region of the reference video to the spatial/temporal perceptually sensitive region of the comparison video.

Here, the term "change" and the term "difference" may be used to have the same meaning, and may be used interchangeably with each other. That is, "change" may mean the difference between the spatial/temporal perceptually sensitive region of the reference video and the spatial/temporal perceptually sensitive region of the comparison video. Further, "change" may mean the difference between perceptually sensitive regions corresponding to each other in the reference video and the comparison video.

Also, the expression "change from the spatial/temporal perceptually sensitive region of the reference video to the spatial/temporal perceptually sensitive region of the comparison video" may be understood to mean "change in the spatial/temporal perceptually sensitive region of the reference video and the spatial/temporal perceptually sensitive region of the comparison video".

The spatial/temporal perceptually sensitive region change calculation unit 230 may detect a region in which sensitivity has changed.

The region in which sensitivity has changed may be 1) a region which has high sensitivity in a reference video and has low sensitivity in a comparison video and 2) a region which has low sensitivity in a reference video and has high sensitivity in a comparison video.

Alternatively, when the sensitivity of a certain region in the reference video is different from that of the certain region in the comparison video, it may be considered that the sensitivity of the certain region has changed.

Here, the region which has high sensitivity in the reference video and has low sensitivity in the comparison video may be a region in which perceptually important information is lost.

Further, the region which has low sensitivity in the reference video and has high sensitivity in the comparison video may be a region in which perceptually important information is generated. As a representative example of this region, there are blocking artifacts formed in a compressed video when a video is compressed at a high compression ratio.

In other words, the spatial/temporal perceptually sensitive region change calculation unit 230 may detect a region in which perceptually important information is lost and a region in which perceptually important information is generated.

At step 360, the distortion calculation unit 240 may calculate spatial/temporal distortion using results output from the spatial/temporal feature information extraction unit 210, results output from the spatial/temporal perceptually sensitive region detection unit 220, and results output from the spatial/temporal perceptually sensitive region change calculation unit 230.

Here, the results output from the spatial/temporal feature information extraction unit 210 may be the spatial/temporal feature information of the reference video and the spatial/temporal feature information of the comparison video.

The results output from the spatial/temporal perceptually sensitive region detection unit 220 may be the spatial/temporal perceptually sensitive region of the reference video and the spatial/temporal perceptually sensitive region of the comparison video.

The results output from the spatial/temporal perceptually sensitive region change calculation unit 230 may be the change from the spatial/temporal perceptually sensitive region of the reference video to the spatial/temporal perceptually sensitive region of the comparison video.

"Spatial/temporal distortion" may mean one or more of spatial distortion, temporal distortion, and spatio-temporal distortion. Also, "spatial/temporal distortion" may be abbreviated as "distortion".

At step 370, the index calculation unit 250 may generate the results of measurement of the video quality of the comparison video based on distortion indicating the results output from the distortion calculation unit 240. For example, the index calculation unit 250 may convert distortion indicating the results from the distortion calculation unit 240 into the results of video quality measurement.

Here, the results output from the distortion calculation unit 240 may be spatial/temporal distortion.

Figure 4:
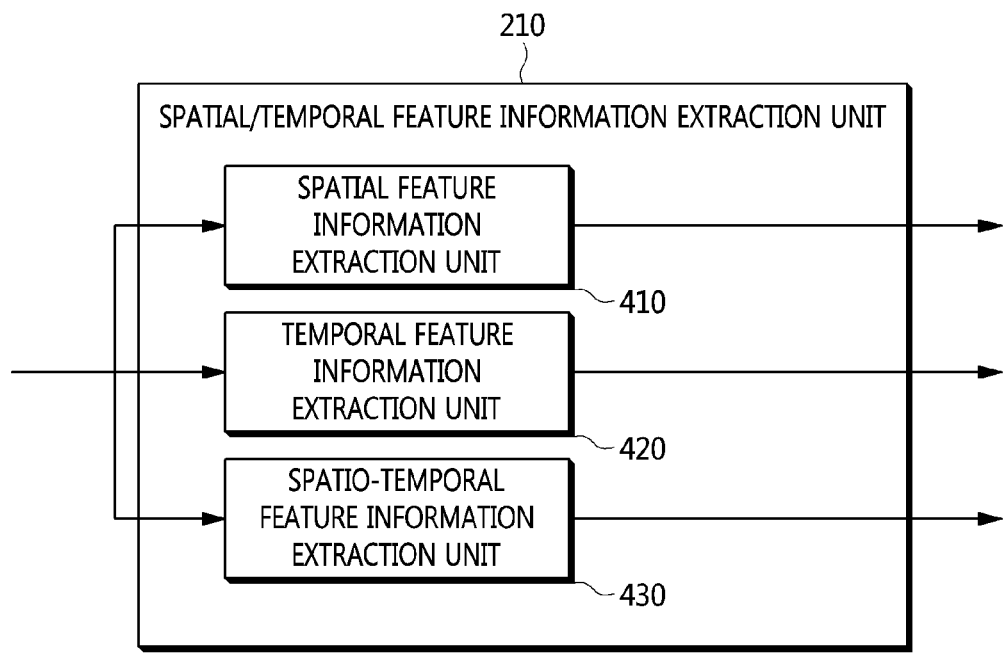
FIG. 4 illustrates the structure of a spatial/temporal feature information extraction unit according to an example.

FIG. 4 illustrates the structure of a spatial/temporal feature information extraction unit according to an example.

The spatial/temporal feature information extraction unit 210 may include a spatial feature information extraction unit 410, a temporal feature information extraction unit 420, and a spatio-temporal feature information extraction unit 430.

In FIGS. 2 and 3, it has been described that one spatial/temporal feature information extraction unit 210 extracts spatial/temporal feature information from a reference video and a comparison video. In contrast, two spatial/temporal feature information extraction units may be configured for a reference video and a comparison video, respectively.

In an embodiment, the case where one spatial/temporal feature information extraction unit 210 is used for the reference video and the comparison video is described.

The functions and operations of the spatial feature information extraction unit 410, the temporal feature information extraction unit 420, and the spatio-temporal feature information extraction unit 430 will be described in detail below.

Figure 5:
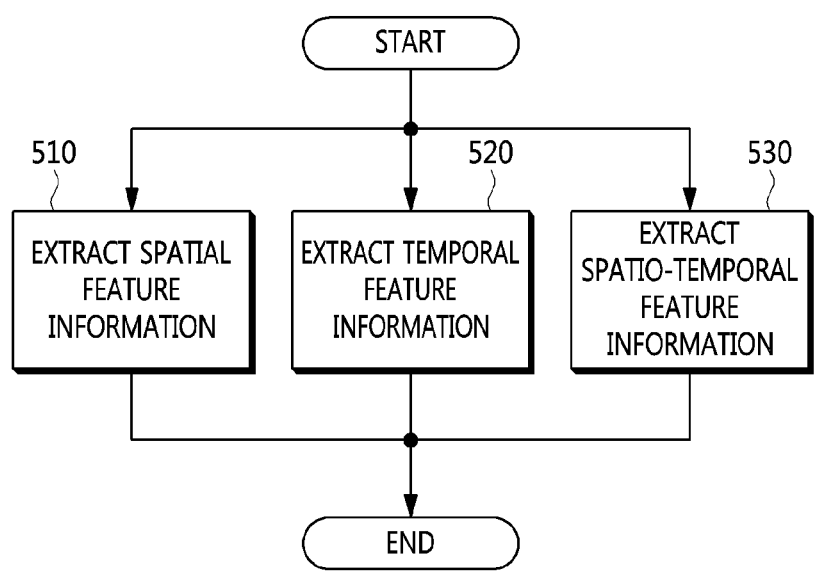
FIG. 5 is a flowchart of a spatial/temporal feature information extraction method according to an example.

FIG. 5 is a flowchart of a spatial/temporal feature information extraction method according to an example.

Step 310, described above with reference to FIG. 3, may include steps 510, 520, and 530. Here, an input video may be a reference video.

Step 330, described above with reference to FIG. 3, may include steps 510, 520, and 530. Here, an input video may be a comparison video.

At step 510, the spatial feature information extraction unit 410 may extract spatial feature information from each image of the input video. The spatial feature information extraction unit 410 may extract pieces of information for respective images of the input video.

At step 520, the temporal feature information extraction unit 420 may extract temporal feature information from multiple images of the input video. The multiple images may be a Group of Pictures (GOP) or a group of features. The spatial feature information extraction unit 410 may extract information in units of multiple images of the input video.

At step 530, the spatio-temporal feature information extraction unit 430 may extract spatio-temporal feature information from each spatio-temporal slice of the input video. The spatio-temporal slice may have a structure into which a GOP is spatially divided. The spatio-temporal feature information extraction unit 430 may extract information in units of a spatio-temporal slice of the input video.

Alternatively, the spatio-temporal feature information extraction unit 430 may be configured through a combination of the spatial feature information extraction unit 410 and the temporal feature information extraction unit 420.

Figure 6:
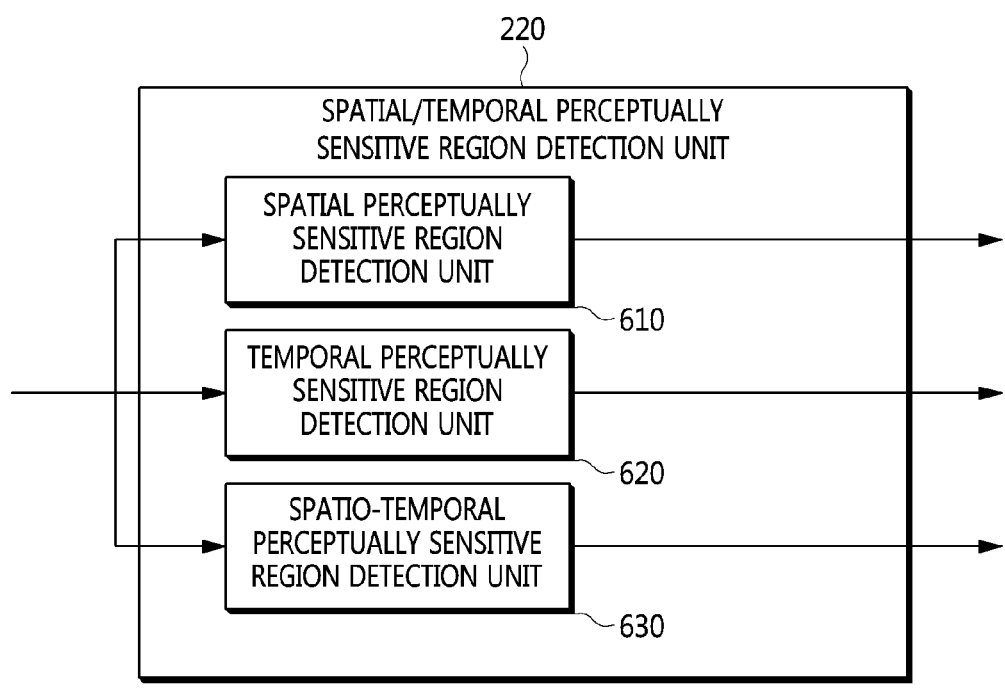
FIG. 6 illustrates the structure of a spatial/temporal perceptually sensitive region detection unit according to an example.

FIG. 6 illustrates the structure of a spatial/temporal perceptually sensitive region detection unit according to an example.

The spatial/temporal perceptually sensitive region detection unit 220 may include a spatial perceptually sensitive region detection unit 610, a temporal perceptually sensitive region detection unit 620, and a spatio-temporal perceptually sensitive region detection unit 630.

In FIGS. 2 and 3, it has been described that one spatial/temporal perceptually sensitive region detection unit 220 extracts spatial/temporal feature information from a reference video and a comparison video. In contrast, two spatial/temporal perceptually sensitive region detection units may be respectively configured for a reference video and a comparison video.

In an embodiment, the case where one spatial/temporal perceptually sensitive region detection unit 220 is used for a reference video and a comparison video is described.

In subjective video quality assessment, each assessor may respectively assess the quality of a reference video and the quality of a comparison video. Here, each assessor may more intensively consider a perceptually sensitive region in each video when assessing the quality of each video. In order to exploit these characteristics, the spatial/temporal perceptually sensitive region detection unit 220 may detect perceptually sensitive regions in the reference video and the comparison video, respectively.

The functions and operations of the spatial perceptually sensitive region detection unit 610, the temporal perceptually sensitive region detection unit 620, and the spatio-temporal perceptually sensitive region detection unit 630 will be described in detail below.

Figure 7:
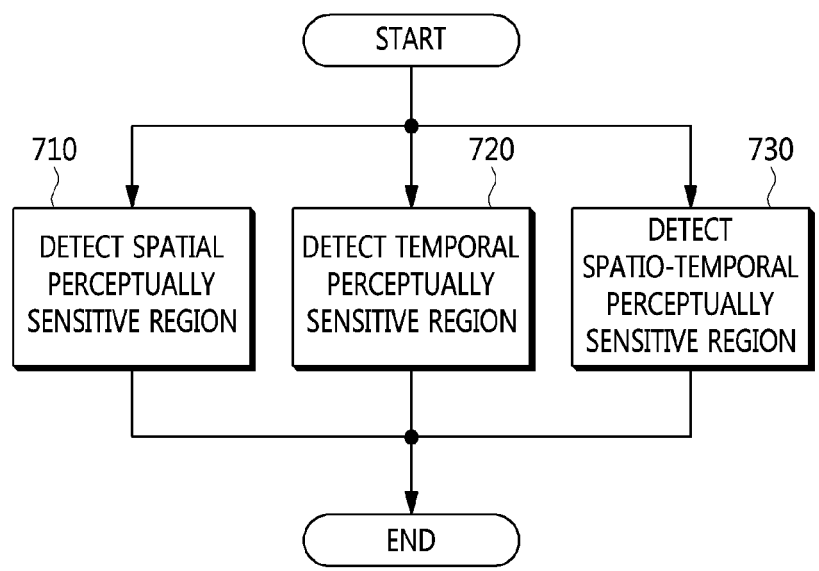
FIG. 7 is a flowchart of a spatial/temporal perceptually sensitive region detection method according to an example.

FIG. 7 is a flowchart of a spatial/temporal perceptually sensitive region detection method according to an example.

Step 320, described above with reference to FIG. 3, may include steps 710, 720, and 730. Here, an input video may be a reference video.

Step 340, described above with reference to FIG. 3, may include steps 710, 720, and 730. Here, an input video may be a comparison video.

At step 710, the spatial perceptually sensitive region detection unit 610 may detect a spatial perceptually sensitive region in each image of the input video. The spatial perceptually sensitive region detection unit 610 may extract pieces of information for respective images of the input video.

At step 720, the temporal perceptually sensitive region detection unit 620 may detect a temporal perceptually sensitive region in multiple images of the input video. The multiple images may be a Group of Pictures (GOP) or a group of features. The temporal perceptually sensitive region detection unit 620 may extract information in units of multiple images of the input video.

At step 730, the spatio-temporal perceptually sensitive region detection unit 630 may detect a spatio-temporal perceptually sensitive region in each spatio-temporal slice of the input video. The spatio-temporal slice may have a structure into which a GOP is spatially divided. The spatio-temporal perceptually sensitive region detection unit 630 may extract information in units of the spatio-temporal slice of the input video.

Alternatively, the spatio-temporal perceptually sensitive region detection unit 630 may also be configured through a combination of the spatial perceptually sensitive region detection unit 610 and the temporal perceptually sensitive region detection unit 620.

Figure 8:
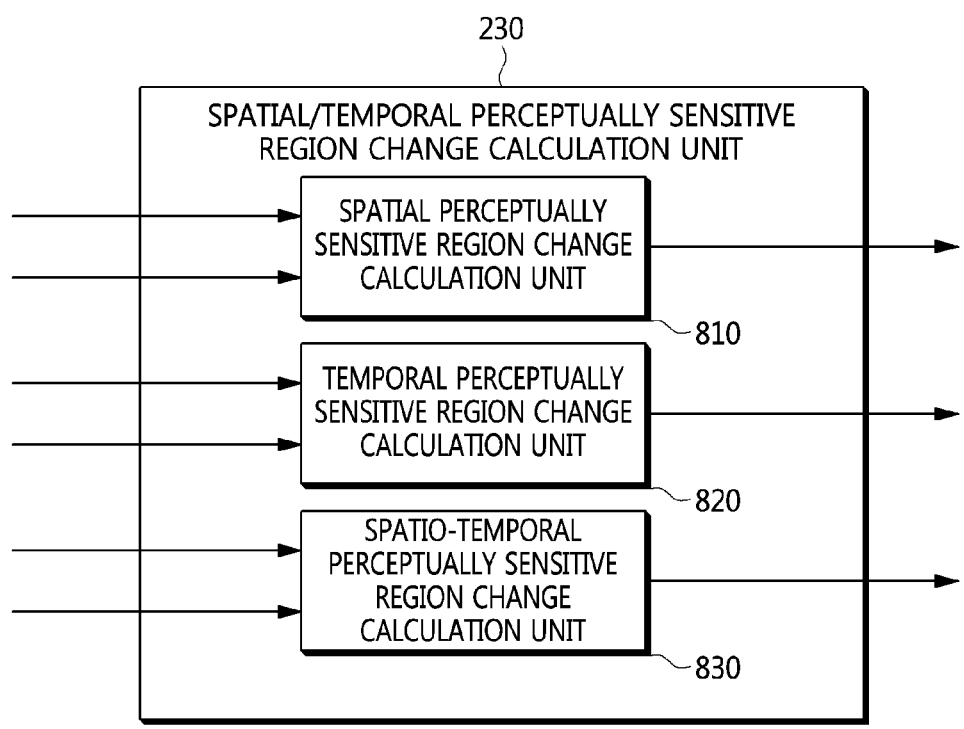
FIG. 8 illustrates the structure of a spatial/temporal perceptually sensitive region change calculation unit according to an example.

FIG. 8 illustrates the structure of a spatial/temporal perceptually sensitive region change calculation unit according to an example.

The spatial/temporal perceptually sensitive region change calculation unit 230 may include a spatial perceptually sensitive region change calculation unit 810, a temporal perceptually sensitive region change calculation unit 820, and a spatio-temporal perceptually sensitive region change calculation unit 830.

As in the case of DSCQS, in subjective quality assessment for assessing video qualities for a pair of a reference video and an assessment video, each assessor may assess the video quality by more intensively considering changes in perceptually sensitive regions in the two videos. In order to use these features, the spatial/temporal perceptually sensitive region change calculation unit 230 may detect a change, such as the difference between the perceptually sensitive region of the reference video and the perceptually sensitive region of the comparison video.

The functions and operations of the spatial perceptually sensitive region change calculation unit 810, the temporal perceptually sensitive region change calculation unit 820, and the spatio-temporal perceptually sensitive region change calculation unit 830 will be described in detail below.

Figure 9:
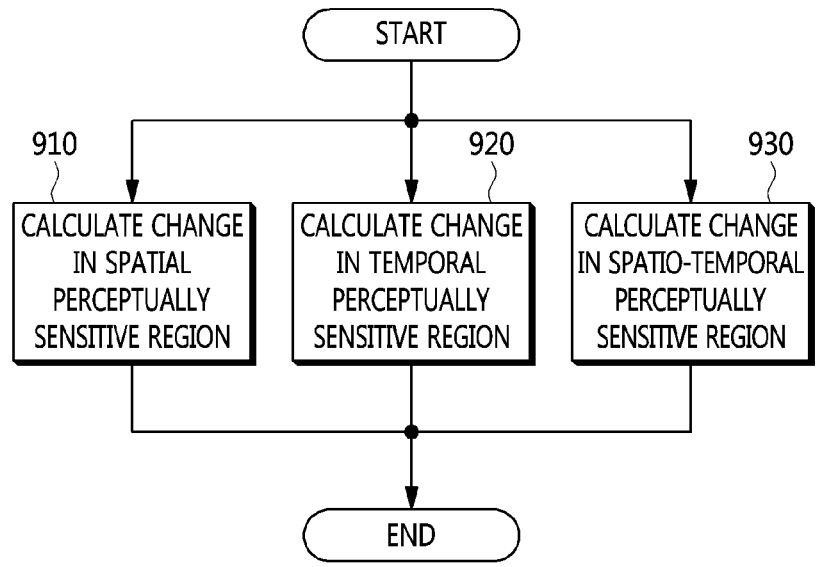
FIG. 9 is a flowchart of a method for calculating a change in a spatial/temporal perceptually sensitive region according to an example.

FIG. 9 is a flowchart of a method for calculating a change in a spatial/temporal perceptually sensitive region according to an example.

Step 350, described above with reference to FIG. 3, may include steps 910, 920, and 930.

At step 910, the spatial perceptually sensitive region change calculation unit 810 may calculate a change in a spatial perceptually sensitive region from the images of a reference video and a comparison video. The spatial perceptually sensitive region change calculation unit 810 may extract pieces of information for respective images of the reference video and the comparison video.

At step 920, the temporal perceptually sensitive region change calculation unit 820 may calculate a change in a temporal perceptually sensitive region from the multiple images of the reference video and the comparison video. The multiple images may be a Group of Pictures (GOP) or a group of features. The temporal perceptually sensitive region change calculation unit 820 may extract pieces of information in units of multiple images of the reference video and the comparison video.

At step 930, the spatio-temporal perceptually sensitive region change calculation unit 830 may calculate a change in a spatio-temporal perceptually sensitive region from the spatio-temporal slice of each of the reference video and the comparison video. Each spatio-temporal slice may have a structure into which a GOP is spatially divided. The spatio-temporal perceptually sensitive region change calculation unit 830 may extract information in units of the spatio-temporal slice of each of the reference video and the comparison video.

Alternatively, the spatio-temporal perceptually sensitive region change calculation unit 830 may be configured through a combination of the spatial perceptually sensitive region change calculation unit 810 and the temporal perceptually sensitive region change calculation unit 820.

Figure 10:
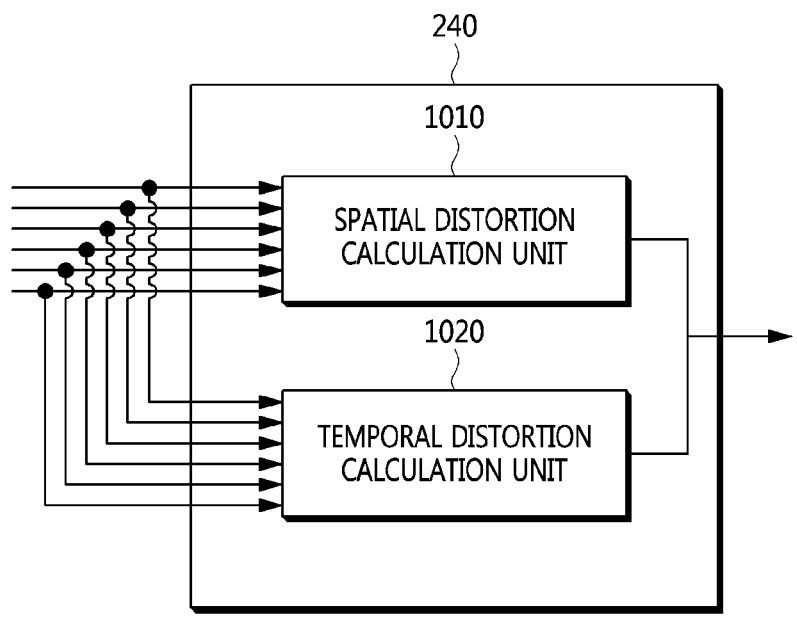
FIG. 10 illustrates the structure of a distortion calculation unit according to an example.

FIG. 10 illustrates the structure of a distortion calculation unit according to an example.

The distortion calculation unit 240 may include a spatial distortion calculation unit 1010 and a temporal distortion calculation unit 1020.

The functions and operations of the spatial distortion calculation unit 1010 and the temporal distortion calculation unit 1020 will be described in detail below.

Figure 11:
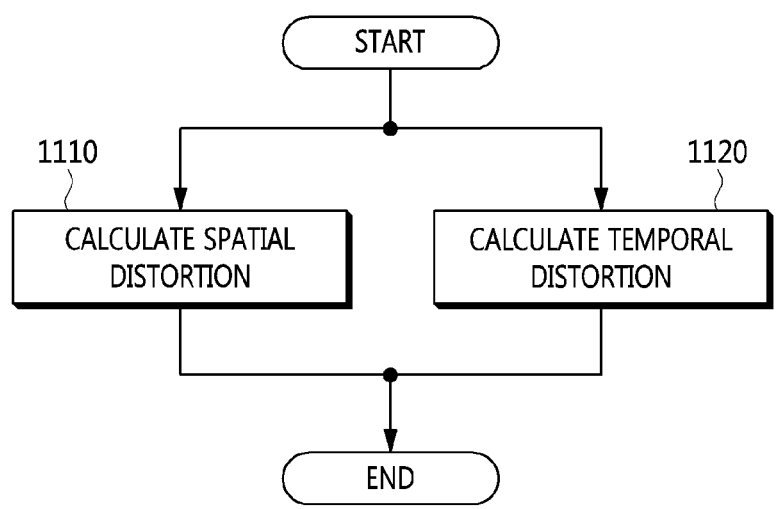
FIG. 11 is a flowchart of a distortion calculation method according to an example.

FIG. 11 is a flowchart of a distortion calculation method according to an example.

At step 1110, the spatial distortion calculation unit 1010 may calculate spatial distortion using results output from the spatial/temporal feature information extraction unit 210, results output from the spatial/temporal perceptually sensitive region detection unit 220, and results output from the spatial/temporal perceptually sensitive region change calculation unit 230.

At step 1120, the temporal distortion calculation unit 1020 may calculate temporal distortion using results output from the spatial/temporal feature information extraction unit 210, results output from the spatial/temporal perceptually sensitive region detection unit 220, and results output from the spatial/temporal perceptually sensitive region change calculation unit 230.

Figure 12:
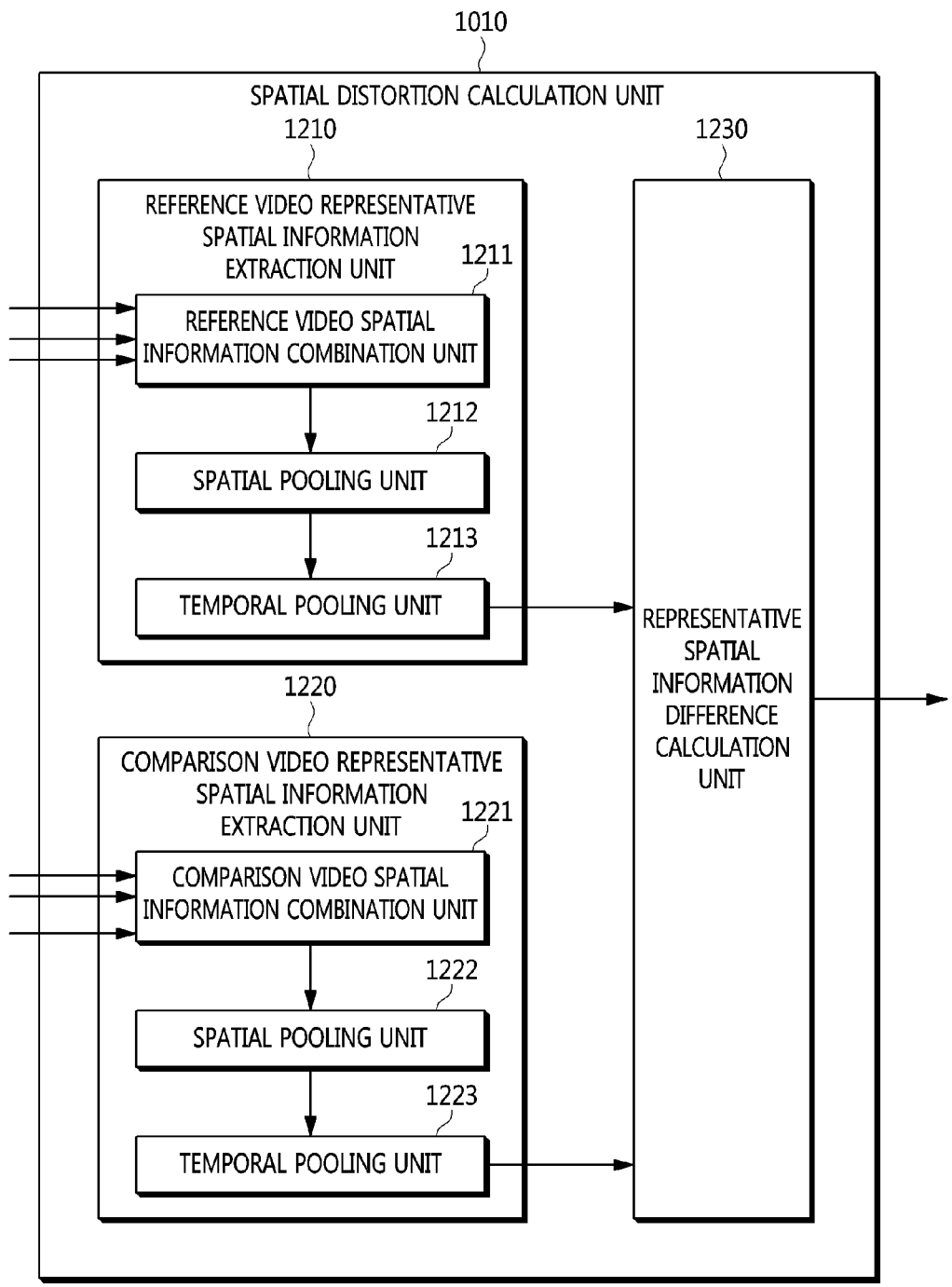
FIG. 12 illustrates the structure of a spatial distortion calculation unit according to an example.

FIG. 12 illustrates the structure of a spatial distortion calculation unit according to an example.

The spatial distortion calculation unit 1010 may include a reference video representative spatial information extraction unit 1210, a comparison video representative spatial information extraction unit 1220, and a representative spatial information difference calculation unit 1230.

The reference video representative spatial information extraction unit 1210 may include a reference video spatial information combination unit 1211, a spatial pooling unit 1212, and a temporal pooling unit 1213.

The comparison video representative spatial information extraction unit 1220 may include a comparison video spatial information combination unit 1221, a spatial pooling unit 1222, and a temporal pooling unit 1223.

The functions and operations of the reference video representative spatial information extraction unit 1210, the comparison video representative spatial information extraction unit 1220, and the representative spatial information difference calculation unit 1230 will be described in detail below.

Figure 13:
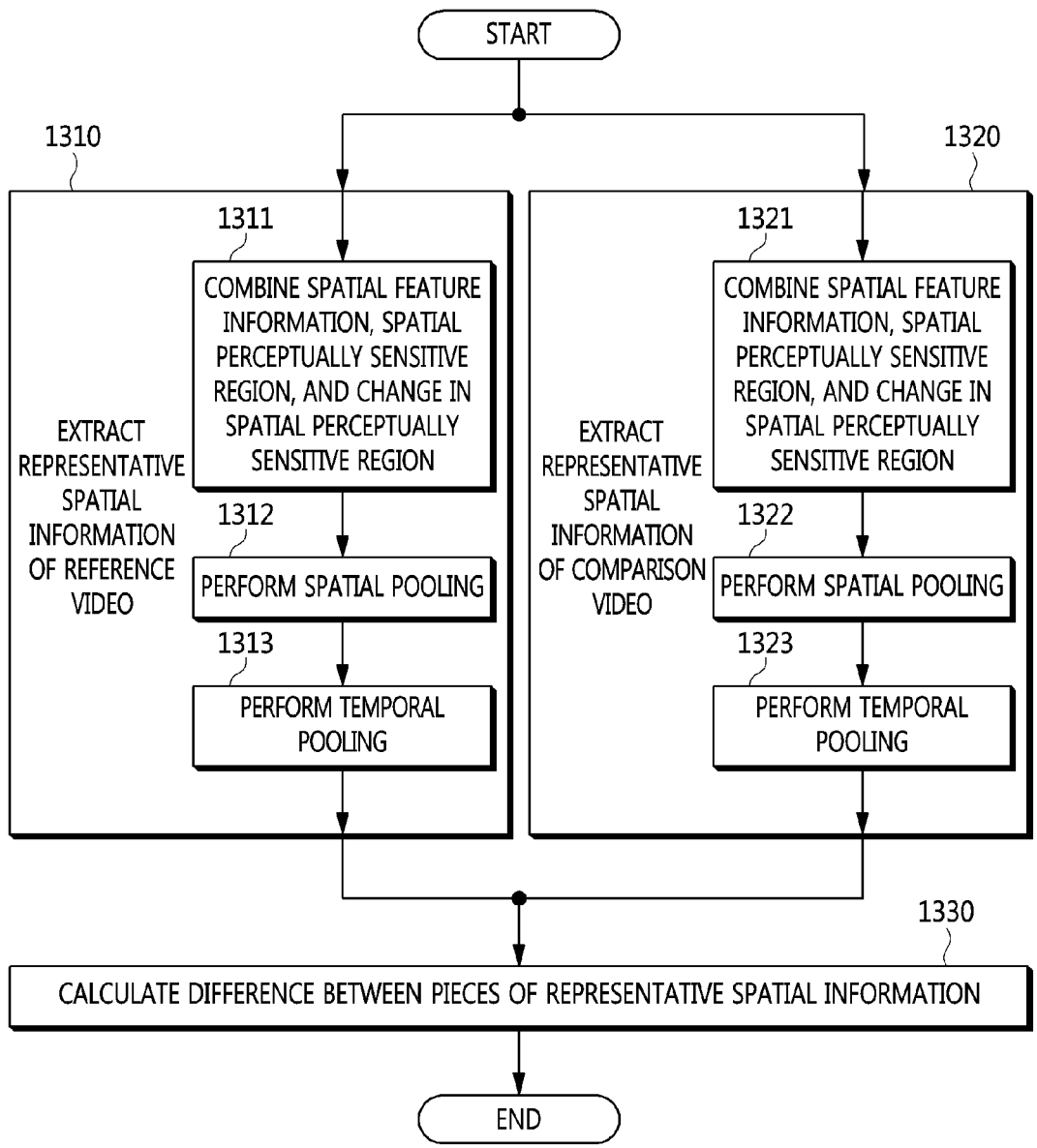
FIG. 13 is a flowchart of spatial distortion calculation according to an example.

FIG. 13 is a flowchart of spatial distortion calculation according to an example.

For convenience of description, the embodiment may be described for the case where the spatial/temporal feature information extraction unit 210 includes only the spatial feature information extraction unit 410. Unlike this description, the spatial/temporal feature information extraction unit 210 may include two or more of the spatial feature information extraction unit 410, the temporal feature information extraction unit 420, and the spatio-temporal feature information extraction unit 430.

Step 1110, described above with reference to FIG. 11, may include steps 1310, 1320, and 1330.

At step 1310, the reference video representative spatial information extraction unit 1210 may extract representative spatial information of the reference video using 1) the spatial feature information of a reference video extracted from the reference video, 2) the spatial perceptually sensitive region of the reference video detected in the reference video, and 3) the change from the spatial perceptually sensitive region of the reference video to the spatial perceptually sensitive region of a comparison video, which is calculated from the reference video and the comparison video.

Steps 1310 may include steps 1311, 1312, and 1313.

At step 1311, the reference video spatial information combination unit 1211 may generate combined spatial information of the reference video by combining 1) the spatial feature information of the reference video, 2) the spatial perceptually sensitive region of the reference video, and 3) the change in the spatial perceptually sensitive region. The change in the spatial perceptually sensitive region may refer to the change from the spatial perceptually sensitive region of the reference video to the spatial perceptually sensitive region of a comparison video.

In other words, the combined spatial information of the reference video may be the spatial feature information of the reference video in which the perceptual importance of each region is reflected.

The reference video spatial information combination unit 1211 may cause the spatial feature information of the reference video to reflect the perceptual importance of the corresponding region using 1) the spatial perceptually sensitive region of the reference video and 2) the change in the spatial perceptually sensitive region. In other words, the perceptual importance of each region may be reflected in the spatial feature information of the reference video by the reference video spatial information combination unit 1211.

At step 1312, the spatial pooling unit 1212 may extract the representative spatial information of the reference video from the combined spatial information of the reference video, which indicates the results output from the reference video spatial information combination unit 1211.

The spatial pooling unit 1212 may extract the representative spatial information of each image of the reference video from the spatial feature information of the reference video in which the perceptual importance of each region is reflected.

For example, the representative spatial information of each image may be the mean value of pieces of spatial information of the corresponding image.

For example, the representative spatial information of each image may be the standard deviation of pieces of spatial information of the corresponding image.

For example, the spatial pooling unit 1212 may extract the representative spatial information of the image using spatial pooling of the type that is used in an automatic video-quality measurement method.

At step 1313, the temporal pooling unit 1213 may extract the representative spatial information of the reference video (or GOP of the reference video) from pieces of representative spatial information of respective images of the reference video (or GOP of the reference video).

For example, the representative spatial information of the reference video (or the GOP of the reference video) may be the mean value of pieces of spatial information of the reference video (or the GOP of the reference video).

For example, the representative spatial information of the reference video (or the GOP of the reference video) may be the standard deviation of the pieces of spatial information of the reference video (or the GOP of the reference video).

For example, the temporal pooling unit 1213 may extract the representative spatial information of the reference video (or the GOP of the reference video) using temporal pooling of the type that is used in an automatic video-quality measurement method.

At step 1320, the comparison video representative spatial information extraction unit 1220 may extract the representative spatial information of the comparison video using 1) the spatial feature information of the comparison video extracted from the comparison video, 2) the spatial perceptually sensitive region of the comparison video detected in the comparison video, and 3) the change from the spatial perceptually sensitive region of the reference video to the spatial perceptually sensitive region of the comparison video, which is calculated from the reference video and the comparison video.

Step 1320 may include steps 1321, 1322, and 1323.

At step 1321, the comparison video spatial information combination unit 1221 may generate combined spatial information of the comparison video by combining 1) the spatial feature information of the comparison video, 2) the spatial perceptually sensitive region of the comparison video, and 3) the change in the spatial perceptually sensitive region. The change in the spatial perceptually sensitive region may refer to the change from the spatial perceptually sensitive region of the reference video to the spatial perceptually sensitive region of the comparison video.

In other words, the combined spatial information of the comparison video may be the spatial feature information of the comparison video in which the perceptual importance of each region is reflected.

The comparison video spatial information combination unit 1221 may cause the spatial feature information of the comparison video to reflect the perceptual importance of the corresponding region using 1) the spatial perceptually sensitive region of the comparison video and 2) the change in the spatial perceptually sensitive region. In other words, the perceptual importance of each region may be reflected in the spatial feature information of the comparison video through the comparison video spatial information combination unit 1221.

At step 1322, the spatial pooling unit 1222 may extract the representative spatial information of the comparison video from the combined spatial information of the comparison video, which indicates the results output from the comparison video spatial information combination unit 1221.

The spatial pooling unit 1222 may extract the representative spatial information of each image of the comparison video from the spatial feature information of the comparison video in which the perceptual importance of each region is reflected.

For example, the representative spatial information of each image may be the mean value of pieces of spatial information of the corresponding image.

For example, the representative spatial information of each image may be the standard deviation of pieces of spatial information of the corresponding image.

For example, the spatial pooling unit 1222 may extract the representative spatial information of the image using spatial pooling of the type that is used in an automatic video-quality measurement method.

At step 1323, the temporal pooling unit 1223 may extract the representative spatial information of the comparison video (or GOP of the comparison video) from pieces of representative spatial information of respective images of the comparison video (or GOP of the comparison video).

For example, the representative spatial information of the comparison video (or the GOP of the comparison video) may be the mean value of pieces of spatial information of the comparison video (or the GOP of the comparison video).

For example, the representative spatial information of the comparison video (or the GOP of the comparison video) may be the standard deviation of pieces of spatial information of the comparison video (or the GOP of the comparison video).

For example, the temporal pooling unit 1223 may extract the representative spatial information of the comparison video (or the GOP of the comparison video) using temporal pooling of the type that is used in an automatic video-quality measurement method.

At step 1330, the representative spatial information difference calculation unit 1230 may calculate the difference between the representative spatial information of the reference video and the representative spatial information of the comparison video.

The spatial distortion, described above with reference to FIG. 3, may be the difference between the representative spatial information of the reference video (or each image of the reference video) and the representative spatial information of the comparison video (or each image of the comparison video).

Figure 14:
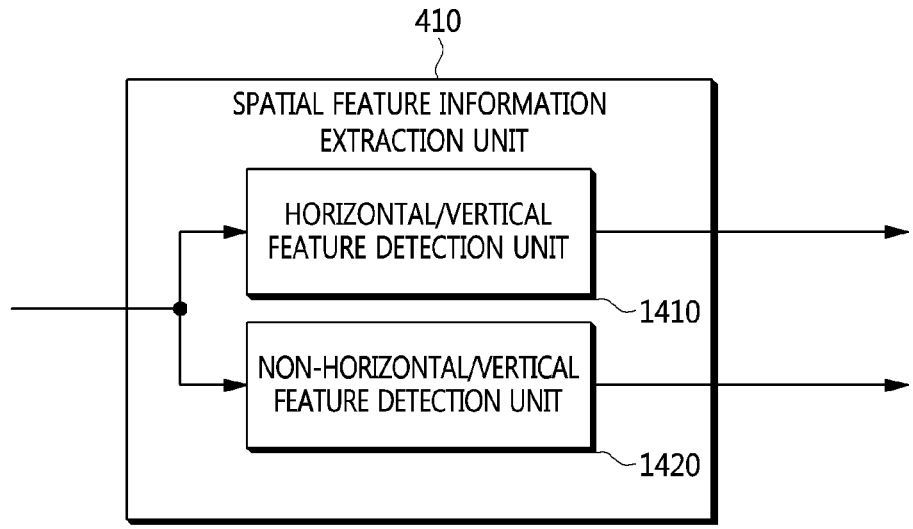
FIG. 14 illustrates the structure of a spatial feature information extraction unit according to an example.

FIG. 14 illustrates the structure of a spatial feature information extraction unit according to an example.

The spatial feature information extraction unit 410 may include a horizontal/vertical feature detection unit 1410 and a non-horizontal/vertical feature detection unit 1420.

The functions and operations of the horizontal/vertical feature detection unit 1410 and the non-horizontal/vertical feature detection unit 1420 will be described in detail below.

Figure 15:
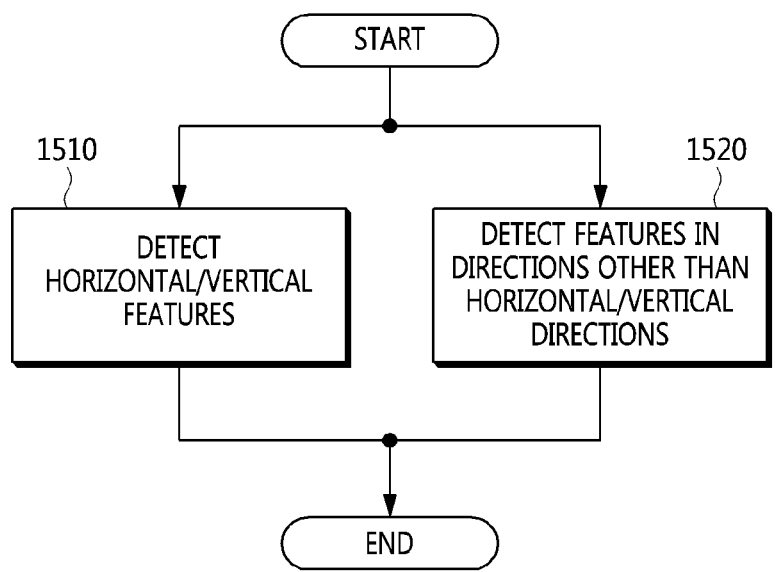
FIG. 15 is a flowchart of spatial feature information extraction according to an example.

FIG. 15 is a flowchart of spatial feature information extraction according to an example.

Step 510, described above with reference to FIG. 5, may include steps 1510 and 1520.

At step 1510, the horizontal/vertical feature detection unit 1410 may detect horizontal/vertical features contained in spatial feature information from each image of an input video.

The horizontal/vertical features may be one or more of horizontal features and vertical features.

Generally, a region having great contrast, such as the boundary of an object, may have high perceptual sensitivity.

Depending on these features, the horizontal/vertical feature detection unit 1410 may detect a region having high perceptual sensitivity in an image using an edge detection method, such as a Sobel operation in video processing.

Such a Sobel operation is only an example, and another operation of extracting a region having high contrast sensitivity may be used as the edge detection method.

The horizontal/vertical feature detection unit 1410 may individually apply the edge detection method to a horizontal direction and a vertical direction. The horizontal/vertical feature detection unit 1410 may derive information about a horizontal edge value by utilizing the horizontal edge detection method for the image. Also, the horizontal/vertical feature detection unit 1410 may derive information about a vertical edge value by utilizing the vertical edge detection method for the image.

The horizontal/vertical feature detection unit 1410 may derive final edge information using the horizontal edge value and the vertical edge value.

For example, the final edge information may be the square root of the sum of the square of the horizontal edge value and the square of the vertical edge value.

At step 1520, the non-horizontal/vertical feature detection unit 1420 may detect the features of the spatial feature information in directions other than the horizontal/vertical directions in each image of the input video.

In order to take into consideration the fact that human characteristics are more sensitive to horizontal/vertical edges and blocking artifacts attributable to encoding are generated in the form of horizontal/vertical edges, the horizontal/vertical feature detection unit 1410 may separate strong edges as horizontal/vertical components from the detection results generated by the edge detection method.

The horizontal/vertical features detected by the horizontal/vertical feature detection unit 1410 may be the strong edges as the separated horizontal/vertical components.

Alternatively, the horizontal/vertical feature detection unit 1410 may separate a region, in which a vertical edge value derived in the middle of detection is equal to or greater than a threshold, and a region, in which a horizontal edge value derived in the middle of detection is equal to or greater than the threshold, from the final edge information. The horizontal/vertical features detected by the horizontal/vertical feature detection unit 1410 may be the separated regions. The non-horizontal/vertical features other than the horizontal/vertical features, detected by the non-horizontal/vertical feature detection unit 1420, may be remaining regions other than the separated regions in the final edge information.

For example, the horizontal/vertical features may indicate a Horizontal-Vertical edge Map (HVM). The features other than the horizontal/vertical features, i.e., non-horizontal/vertical features (from which information about the horizontal/vertical edges is excluded), may indicate an Edge Map (EMP).

Figure 16:
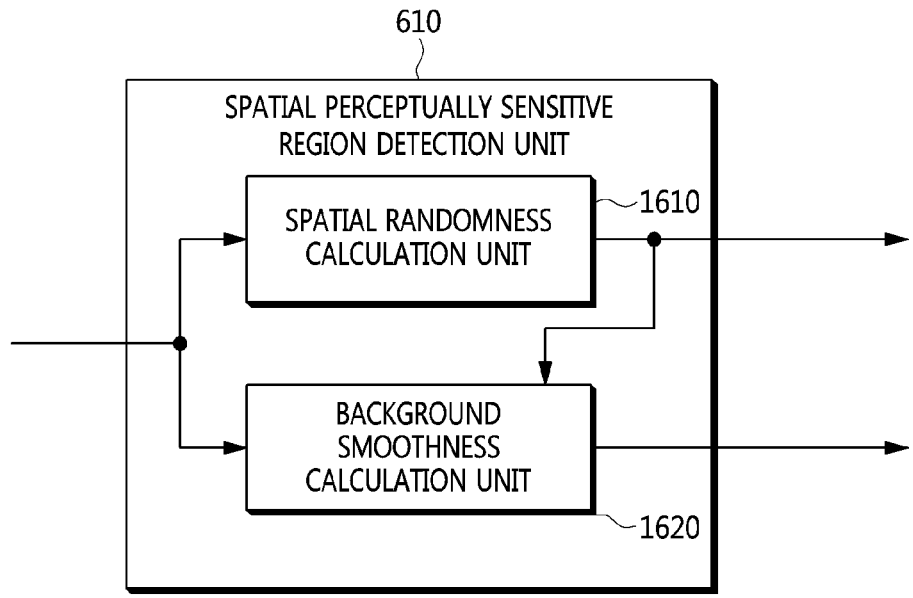
FIG. 16 illustrates the structure of a spatial perceptually sensitive region detection unit according to an example.

FIG. 16 illustrates the structure of a spatial perceptually sensitive region detection unit according to an example.

The spatial perceptually sensitive region detection unit 610 may include a spatial randomness calculation unit 1610 and a background smoothness calculation unit 1620.

The functions and operations of the spatial randomness calculation unit 1610 and the background smoothness calculation unit 1620 will be described in detail below.

Figure 17:
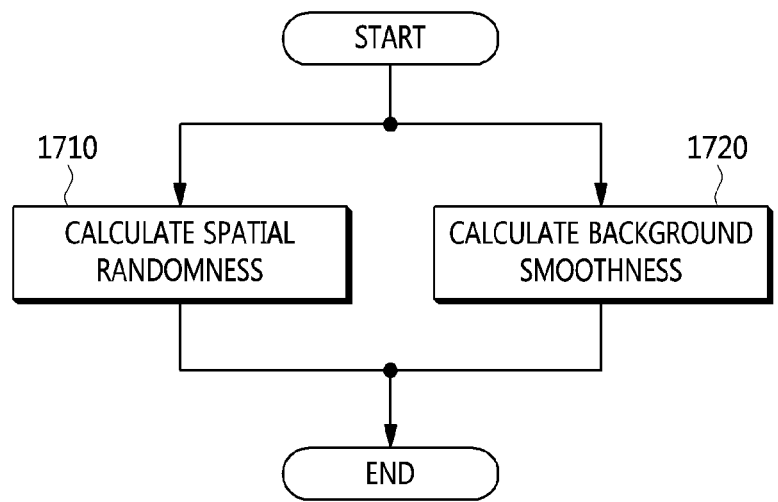
FIG. 17 is a flowchart of spatial perceptually sensitive region detection according to an example.

FIG. 17 is a flowchart of spatial perceptually sensitive region detection according to an example.

Step 710, described above with reference to FIG. 7, may include steps 1710 and 1720.

At step 1710, the spatial randomness calculation unit 1610 may calculate the spatial randomness of a pixel or a block in each image of the input video. The spatial randomness calculation unit 1610 may calculate spatial randomness in units of a pixel or a block for each image of the input video.

The spatial randomness calculation unit 1610 may calculate the spatial randomness of each pixel or block using the similarity to neighbors of the pixel or the block.

For convenience of description, the results of processing by the spatial randomness calculation unit 1610 may be called a "Spatial Randomness Map (SRM)". In other words, the spatial randomness calculation unit 1610 may generate the SRM by calculating the spatial randomness values of pixels or first blocks in each image of the input video. The SRM may include the spatial randomness values of the pixels or the first blocks in each image of the input video.

At step 1720, the background randomness calculation unit 1620 may calculate the background (surround) randomness of a pixel or a block in each image of the input video. The background smoothness calculation unit 1620 may calculate background smoothness in units of a block in each image of the input video.

The size of a second block used as the unit in the background smoothness calculation unit 1620 may be greater than the size of the first block used as the unit in the spatial randomness calculation unit 1610.

The results of processing by the background smoothness calculation unit 1620 may be called a "Smoothness Map (SM)". In other words, the background smoothness calculation unit 1620 may generate the SM by calculating the background smoothness values of second blocks in each image of the input video. The SM may include the background smoothness values of the pixels or blocks in each image of the input video.

Figure 18:
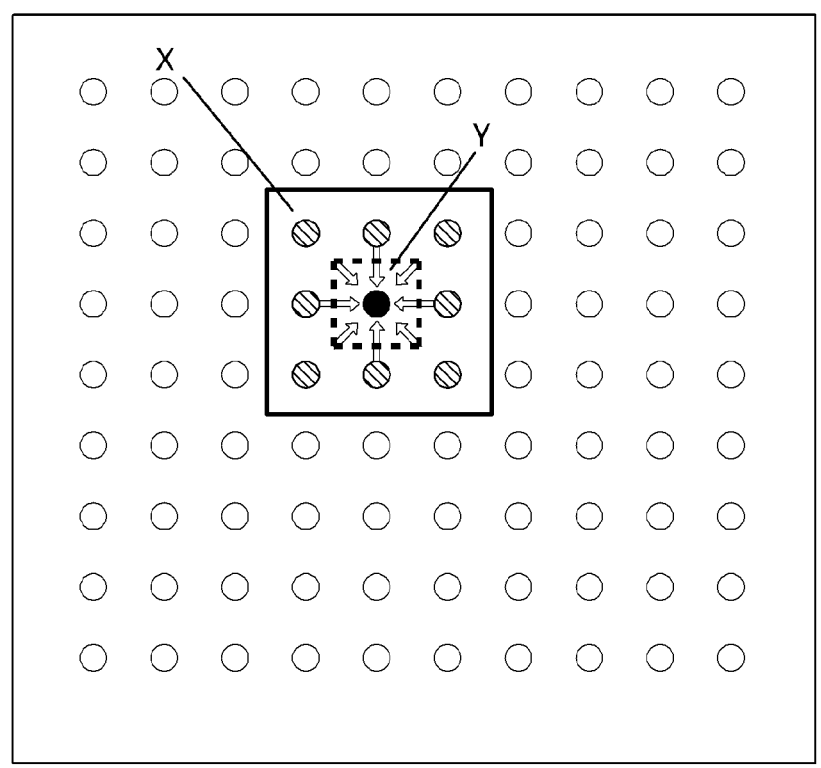
FIG. 18 illustrates the measurement of spatial randomness of an image according to an example.

FIG. 18 illustrates the measurement of spatial randomness of an image according to an example.

Below, the operation of the spatial randomness calculation unit 1610 will be described.

In FIG. 18, a prediction model used to measure spatial randomness is exemplified. In an image, a central region Y may be predicted from neighboring (surrounding) regions X. In FIG. 18, the central region Y may be illustrated as a solid circle, and the neighboring regions X may be illustrated as hatched circles. Arrows may indicate the direction of prediction. Here, the region from which each arrow departs may be used to predict the region indicated by the arrow.

For example, the region may be a pixel or a block. Further, the region may be the unit by which the spatial randomness calculation unit 1610 measures spatial randomness.

When the region is a block, the spatial randomness calculation unit 1610 may perform downsampling on each image of the input video so that each block corresponds to one pixel of the spatial randomness map.

Below, the case where the region is a pixel, that is, the case where the spatial randomness calculation unit 1610 measures spatial randomness in units of a pixel, will be described.

As illustrated in FIG. 18, the spatial randomness calculation unit 1610 may predict the central region Y from the neighboring regions X. This prediction may be represented by the following Equation (1): The neighboring regions X may mean the set of adjacent pixels enclosing the central region Y.

$$\hat{Y} = HX(u) \qquad (1)$$

Here, u denotes a spatial location. H may be a transformation (transfer) matrix for providing optimal prediction.

The symbol "^" may indicate that a value is generated via prediction.

For example, H may be acquired through a minimum mean error optimization method, as given by the following Equation (2):

$$H^* = R_{XY} R_X^{-1} \qquad (2)$$

$R_{XY}$ may be a cross-correlation matrix of X and Y. $R_X$ may be the correlation coefficient matrix of X.

$R_X^{-1}$ may be the inverse matrix of $R_X$.

$R_X^{-1}$ may be acquired using an approximated pseudo-inverse matrix technique, as represented by the following Equation (3):

$$\hat{R}_X^{-1} = U_m \Lambda_m^{-1} U_m^T \qquad (3)$$

Finally, the spatial randomness calculation unit 1610 may acquire SRM using the following Equation (4). SR(u) may indicate the degree of spatial randomness.

$$SR(u) = |Y(u) - R_{XY} R_X^{-1} X(u)| \qquad (4)$$

Here, u may be a vector indicating the location information of a pixel (x,y).

By means of Equation (4) or the like, the spatial randomness calculation unit 1610 may numerically determine the degree of spatial randomness of each image of the input video in units of a pixel.

Below, the operation of the background smoothness calculation unit 1620 will be described.

The background smoothness calculation unit 1620 may calculate background smoothness in units of a block.

When the unit used for the calculation of SRM is the first block, the second block, which is the unit of calculation by the background smoothness calculation unit 1620, must be at least twice the size of the block that is the unit used for calculation of the SRM in both horizontal and vertical directions. In other words, if the size of the first block, which is the unit of calculation by the spatial randomness calculation unit 1610, is (w,h), the size of the second block, which is the unit of calculation by the background smoothness calculation unit 1620, may be greater than (2w,2h).

When the background smoothness of the block is calculated, the background smoothness calculation unit 1620 may calculate the background smoothness of the block using the values of pixels of the SRM corresponding to the inside of the block. The background smoothness of the block may be calculated using the following Equation (5):

$$SM = N_{lc}/W_b^2 \qquad (5)$$

$N_k$ may denote the number of pixels having spatial randomness lower than a threshold in the block, which is the target of calculation (i.e., pixels having low randomness). $W_b^2$ may denote the area of the block (i.e. the number of pixels in the block).

Below, the operations of the reference video spatial information combination unit 1211 and the comparison video spatial information combination unit 1221 are described. Hereinafter, the reference video spatial information combination unit 1211 and the comparison video spatial information combination unit 1221 are collectively abbreviated as a "spatial information combination unit". The description of the spatial information combination unit may be applied to each of the reference video spatial information combination unit 1211 and the comparison video spatial information combination unit 1221. An input video applied to the spatial information combination unit may be construed as a reference video from the standpoint of the reference video spatial information combination unit 1211, and may be construed as a comparison video from the standpoint of the comparison video spatial information combination unit 1221.

The spatial information combination unit may combine three pieces of input information into a single piece of information. Here, the three pieces of input information may be 1) the spatial feature information of the input video, 2) the spatial perceptually sensitive region of the input video, and 3) the change in the spatial perceptually sensitive region.

The spatial information combination unit may more strongly emphasize the spatial features of a perceptually sensitive region, and may more weakly consider the spatial features of a perceptually insensitive region. Also, the fact that a spatial perceptually sensitive region has changed in the reference video and the comparison video may mean that important information has been lost or that artifacts greatly influencing video quality have formed. Therefore, when the spatial perceptually sensitive region has changed in the reference video and the comparison video, the spatial information combination unit may emphasize the spatial features of an area in which the spatial perceptually sensitive region has changed.

Input to the spatial information combination unit may include the above-described entities, that is, 1) HVM (i.e., horizontal/vertical component features), 2) EM (i.e., features in directions other than horizontal/vertical directions), 3) SRM (i.e., spatial randomness), and 4) SM (i.e., background smoothness). When the inputs applied to the spatial information combination unit are HVM, EM, SRM, and SM, the following Equations (6) to (9) may be established.

$$EM'_{ref}(x,y)=EM_{ref}(x,y)\cdot SVW_{ref}(x,y) \quad (6)$$

$$HVM'_{ref}(x,y)=HVM_{ref}(x,y)\cdot SVW_{ref}(x,y) \quad (7)$$

$$EM'_{comp}(x,y)=EM_{comp}(x,y)\cdot SVW_{comp}(x,y) \quad (8)$$

$$HVM'_{comp}(x,y)=HVM_{comp}(x,y)\cdot SVW_{comp}(x,y) \quad (9)$$

Equations (6) and (7) may indicate spatial information combination for each image of the reference video.

Equations (8) and (9) may indicate spatial information combination for each image of the comparison video. The term "ref" denotes the image of the reference video. The term "comp" denotes the image of the comparison video. "x" and "y" denote the coordinates of pixels of each image. "SVW" denotes a perceptual weight for existing spatial information (or spatial visual weight).

The symbol "'" denotes updated values. For example, $EM_{ref}$ (x, y) may indicate the value of updated EM for the pixel. Here, the pixel may be a pixel, the coordinates of which are (x, y), in the image of the reference video.

Alternatively, the symbol "'" may indicate that values are updated when SVW is applied. For example, $EM_{ref}$ may be a weighted EM generated by assigning a weight to the EM of the image of the reference video.

The symbol "·" denotes a product. The symbol "·" may mean that values (i.e., elements of matrixes) at the same location in two maps (i.e. matrixes) are multiplied.

The spatial information combination unit may update the EM of the reference video by applying a perceptual weight to the EM of the reference video.

The spatial information combination unit may update the HVM of the reference video by applying a perceptual weight to the HVM of the reference video.

The spatial information combination unit may update the EM of the comparison video by applying a perceptual weight to the EM of the comparison video.

The spatial information combination unit may update the HVM of the comparison video by applying a perceptual weight to the HVM of the comparison video.

For example, the perceptual weights to be applied to the spatial feature information of each image of the reference video used in Equations (6) and (7) may be defined by the following Equation (10):

$$SVW_{ref}(x,y)=w_{SRM}\times SRM_{ref}(x,y)^a\times w_{SM}\times SM_{ref}(x,y)^b \quad (10)$$

"w" denotes a perceptual weight.

For convenience of description, although the same perceptual weight has been used in Equations (6) and (7), different perceptual weights may be used in Equations (6) and (7).

For example, the perceptual weight to be applied to the spatial feature information of the image of the comparison video used in Equations (8) and (9) may be defined by the following Equation (11):

$$SVW_{comp}(x,y)=w_{SRM}\times SRM_{comp}(x,y)^a\times w_{SM}\times SM_{comp}(x,y)^b \quad (11)$$

For convenience of description, although the same perceptual weight has been used in Equations (8) and (9), different perceptual weights may be used in Equation (8) and (9).

The perceptual weights in Equations (10) and (11) may be ones in which the change in a spatial perceptually sensitive region is not reflected. The following Equations (12) and (13) may indicate updated perceptual weights in which the change in the spatial perceptually sensitive region is combined. That is, Equations (12) and (13) may indicate perceptual weights in which the change in the spatial perceptually sensitive region is reflected.

$$SVW'_{ref}(x,y)=SVW_{ref}(x,y)+w_{diff}\times|SVW_{ref}(x,y)-SVW_{comp}(x,y)| \quad (12)$$

$$SVW'_{comp}(x,y)=SVW_{comp}(x,y)+w_{diff}\times|SVW_{comp}(x,y)-SVW_{comp}(x,y)| \quad (13)$$

In the above-described Equations (10), (11), (12), and (13), it is described that the same perceptual weights are applied both to the image of the reference video and to the image of the comparison video. Unlike this example, different perceptual weights may be respectively applied to the image of the reference video and to the image of the comparison video.

Figure 19:
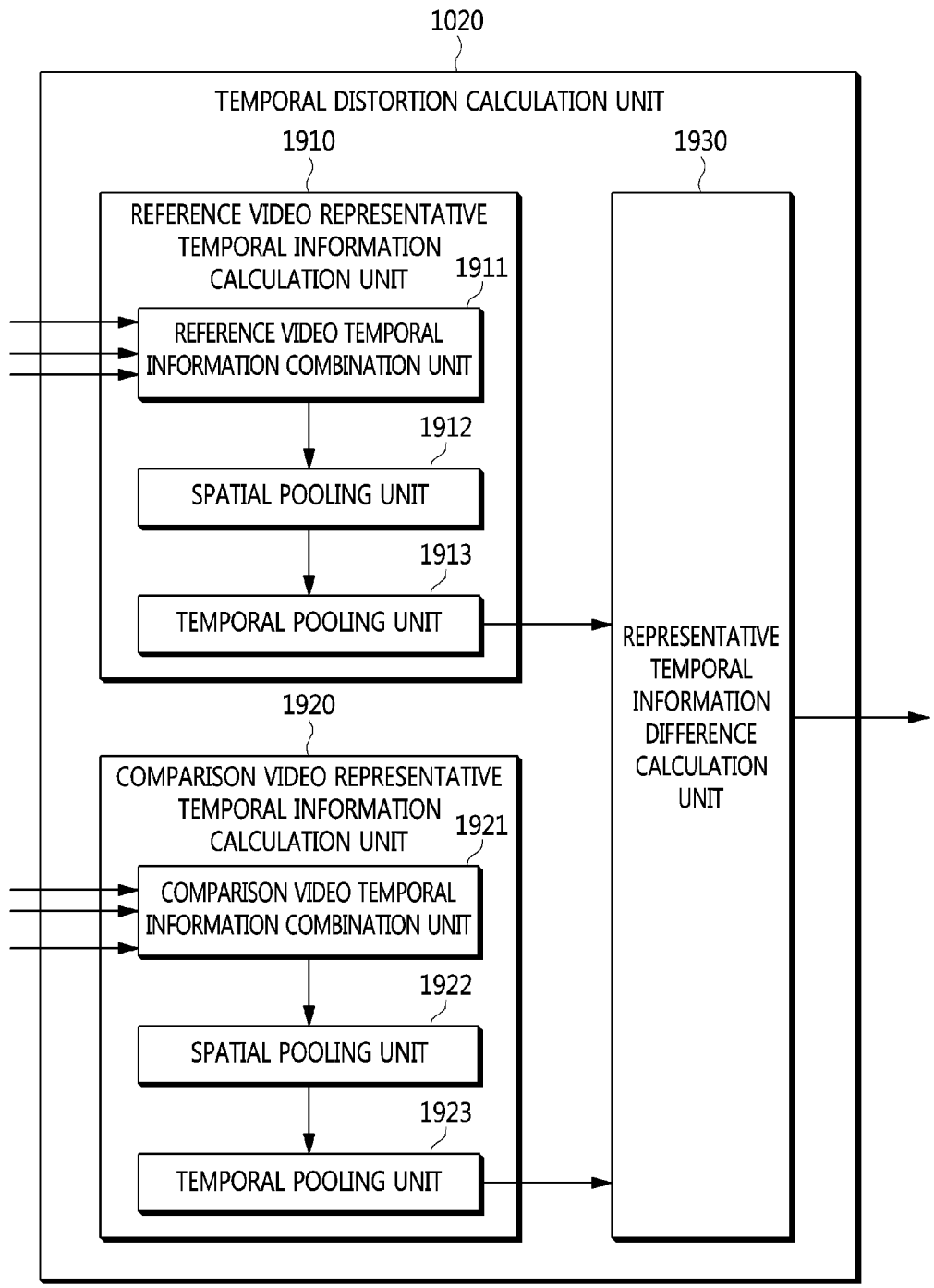
FIG. 19 illustrates the structure of a temporal distortion calculation unit according to an example.

FIG. 19 illustrates the structure of a temporal distortion calculation unit according to an example.

The temporal distortion calculation unit 1020 may include a reference video representative temporal information calculation unit 1910, a comparison video representative temporal information calculation unit 1920, and a representative temporal information difference calculation unit 1930.

The reference video representative temporal information calculation unit 1910 may include a reference video temporal information combination unit 1911, a spatial pooling unit 1912, and a temporal pooling unit 1913.

The comparison video representative temporal information calculation unit 1920 may include a comparison video temporal information combination unit 1921, a spatial pooling unit 1922, and a temporal pooling unit 1923.

The functions and operations of the reference video representative temporal information calculation unit 1910, the comparison video representative temporal information calculation unit 1920, and the representative temporal information difference calculation unit 1930 will be described in detail below.

Figure 20:
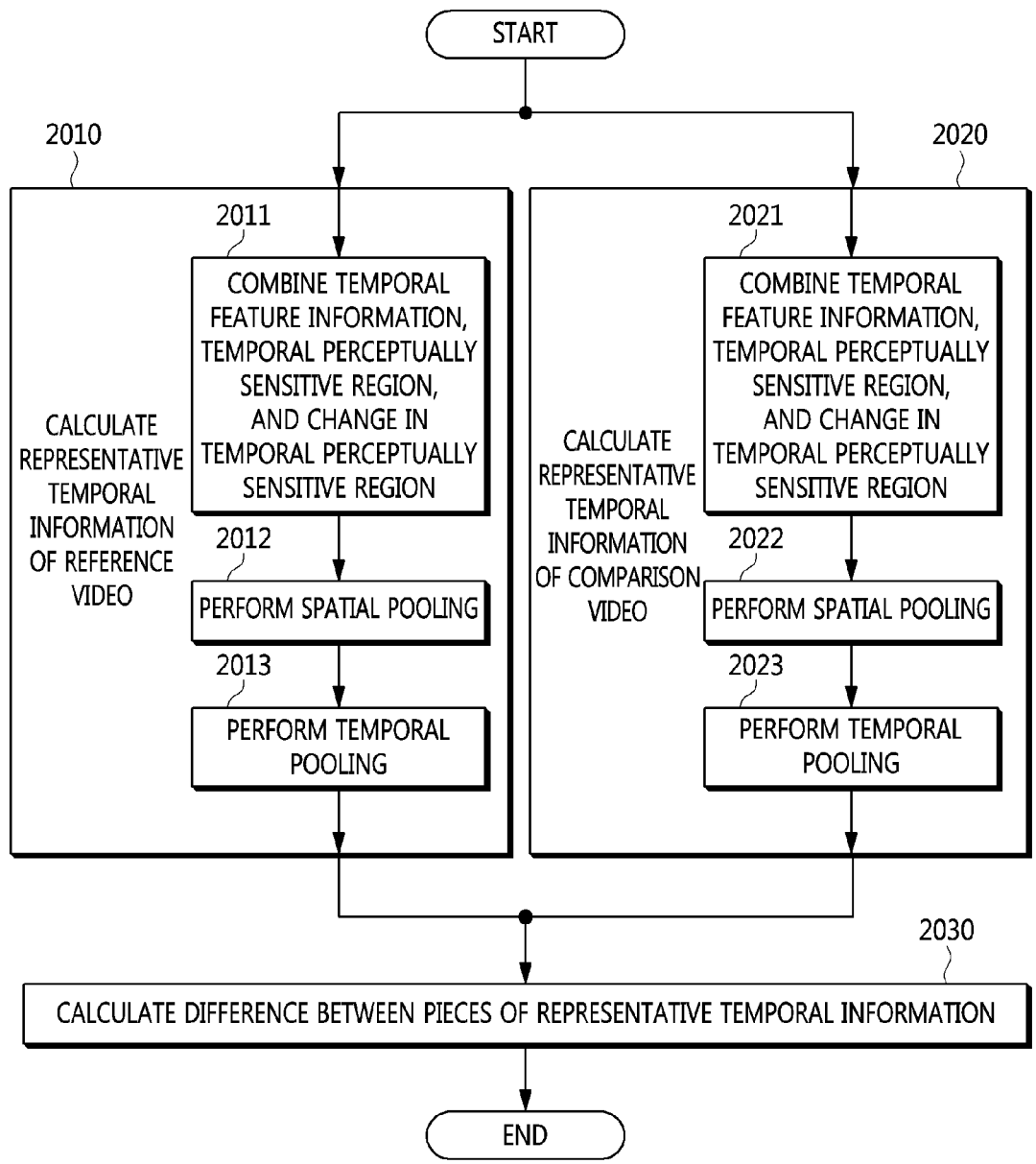
FIG. 20 is a flowchart of temporal distortion calculation according to an example.

FIG. 20 is a flowchart of temporal distortion calculation according to an example.

For convenience of description, the embodiment may be described for the case where the spatial/temporal feature information extraction unit 210 includes only the temporal feature information extraction unit 420. Unlike this description, the spatial/temporal feature information extraction unit 210 may include two or more of the spatial feature information extraction unit 410, the temporal feature information extraction unit 420, and the spatio-temporal feature information extraction unit 430.

Step 1120, described above with reference to FIG. 11, may include steps 2010, 2020, and 2030.

At step 2010, the reference video representative temporal information calculation unit 1910 may calculate the representative temporal information of the reference video using 1) the temporal feature information of the reference video extracted from the reference video, 2) a temporal perceptually sensitive region of the reference video detected in the reference video, and 3) the change from the temporal perceptually sensitive region of the reference video to the temporal perceptually sensitive region of the comparison video, which is calculated from the reference video and the comparison video.

Steps 2010 may include steps 2011, 2012, and 2013.

At step 2011, the reference video temporal information combination unit 1911 may generate combined temporal information of the reference video by combining 1) the temporal feature information of the reference video, 2) a temporal perceptually sensitive region of the reference video, and 3) the change in the temporal perceptually sensitive region. The change in the temporal perceptually sensitive region may refer to the change from the temporal perceptually sensitive region of the reference video to the temporal perceptually sensitive region of the comparison video.

In other words, the combined temporal information of the reference video may be the temporal feature information of the reference video in which the perceptual importance of each region is reflected.

The reference video temporal information combination unit 1911 may cause the temporal feature information of the reference video to reflect the perceptual importance of the corresponding region using 1) the temporal perceptually sensitive region of the reference video and 2) the change in the temporal perceptually sensitive region. In other words, the perceptual importance of each region may be reflected in the temporal feature information of the reference video by the reference video temporal information combination unit 1911.

At step 2012, the spatial pooling unit 1912 may extract the representative temporal information of the reference video from the combined temporal information of the reference video, which indicates the results output from the reference video temporal information combination unit 1911.

The spatial pooling unit 1912 may extract the pieces of representative temporal information of respective images of the reference video from the temporal feature information of the reference video in which the perceptual importance of each region is reflected.

For example, the representative temporal information of each image may be the mean value of pieces of temporal information of the corresponding image.

For example, the representative temporal information of each image may be the standard deviation of pieces of temporal information of the corresponding image.

For example, the spatial pooling unit 1912 may extract the representative temporal information of the image using spatial pooling of the type that is used in an automatic video-quality measurement method.

At step 2013, the temporal pooling unit 1913 may extract the representative temporal information of the reference video (or the GOP of the reference video) from pieces of representative temporal information of respective images of the reference video (or the GOP of the reference video).

For example, the representative temporal information of the reference video (or the GOP of the reference video) may be the mean value of pieces of temporal information of the reference video (or the GOP of the reference video).

For example, the representative temporal information of the reference video (or the GOP of the reference video) may be the standard deviation of pieces of temporal information of the reference video (or the GOP of the reference video).

For example, the temporal pooling unit 1913 may extract the representative temporal information of the reference video (or the GOP of the reference video) using temporal pooling of the type that is used in an automatic video-quality measurement method.

At step 2020, the comparison video representative temporal information calculation unit 1920 may calculate the representative temporal information of the comparison video using 1) temporal feature information of the comparison video extracted from the comparison video, 2) a temporal perceptually sensitive region of the comparison video detected in the comparison video, and 3) the change from the temporal perceptually sensitive region of the reference video to the temporal perceptually sensitive region of the comparison video, which is calculated from the reference video and the comparison video.

Step 2020 may include steps 2021, 2022, and 2023.

At step 2021, the comparison video temporal information combination unit 1921 may generate combined temporal information of the comparison video by combining the 1) temporal feature information of the comparison video, 2) temporal perceptually sensitive region of the comparison video, and 3) the change in the temporal perceptually sensitive region. The change in the temporal perceptually sensitive region may refer to the change from the temporal perceptually sensitive region of the reference video to the temporal perceptually sensitive region of the comparison video.

In other words, the combined temporal information of the comparison video may be the temporal feature information of the comparison video in which the perceptual importance of each region is reflected.

The comparison video temporal information combination unit 1921 may cause the temporal feature information of the comparison video to reflect the perceptual importance of the corresponding region using 1) the temporal perceptually sensitive region of the comparison video and 2) the change in the temporal perceptually sensitive region. In other words, the perceptual importance of each region may be reflected in the temporal feature information of the comparison video by the comparison video temporal information combination unit 1921.

At step 2022, the spatial pooling unit 1922 may extract the representative temporal information of the comparison video from the combined temporal information of the comparison video, which indicates the results output from the comparison video temporal information combination unit 1921.

The spatial pooling unit 1922 may extract the pieces of representative temporal information of respective images of the comparison video from the temporal feature information of the comparison video in which the perceptual importance of each region is reflected.

For example, the representative temporal information of each image may be the mean value of pieces of temporal information of the corresponding image.

For example, the representative temporal information of each image may be the standard deviation of pieces of temporal information of the corresponding image.

For example, the spatial pooling unit 1922 may extract the representative temporal information of the image using spatial pooling of the type that is used in an automatic video-quality measurement method.

In an embodiment, step 2022, performed by the spatial pooling unit 1922, may be omitted.

At step 2023, the temporal pooling unit 1923 may extract the representative temporal information of the comparison video (or the GOP of the comparison video) from the pieces of representative temporal information of respective images of the comparison video (or the GOP of the comparison video).

For example, the representative temporal information of the comparison video (or the GOP of the comparison video) may be the mean value of pieces of temporal information of the comparison video (or the GOP of the comparison video).

For example, the representative temporal information of the comparison video (or the GOP of the comparison video) may be the standard deviation of pieces of temporal information of the comparison video (or the GOP of the comparison video).

For example, the temporal pooling unit 1923 may extract the representative temporal information of the comparison video (or the GOP of the comparison video) using temporal pooling of the type that is used in an automatic video-quality measurement method.

At step 2030, the representative temporal information difference calculation unit 1930 may calculate the difference between the representative temporal information of the reference video and the representative temporal information of the comparison video.

The temporal distortion, described above with reference to FIG. 3, may be the difference between the representative temporal information of the reference video and the representative temporal information of the comparison video.

Figure 21:
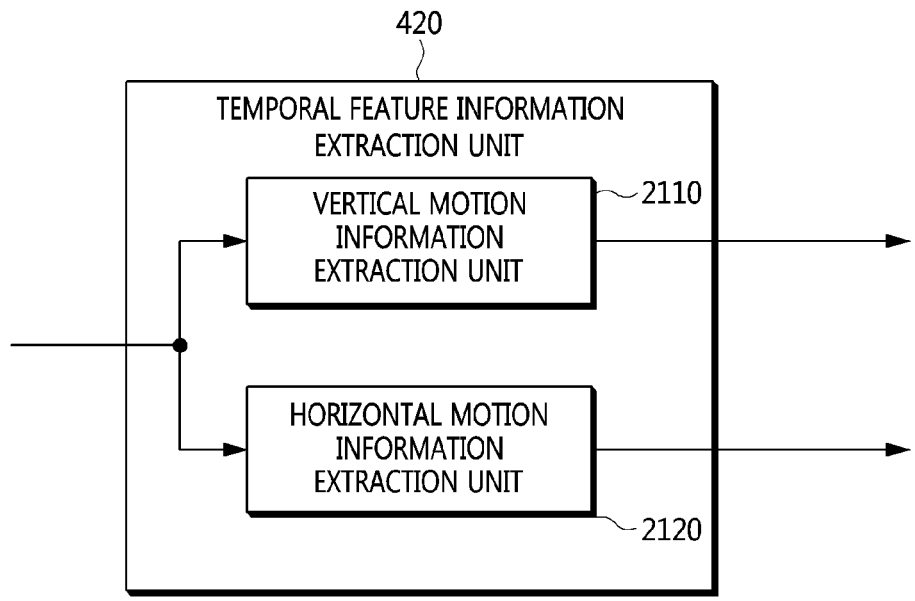
FIG. 21 illustrates the structure of a temporal feature information extraction unit according to an example.

FIG. 21 illustrates the structure of a temporal feature information extraction unit according to an example.

The temporal feature information extraction unit 420 may include a vertical motion information extraction unit 2110 and a horizontal motion information extraction unit 2120.

The functions and operations of the vertical motion information extraction unit 2110 and the horizontal motion information extraction unit 2120 will be described in detail below.

Figure 22:
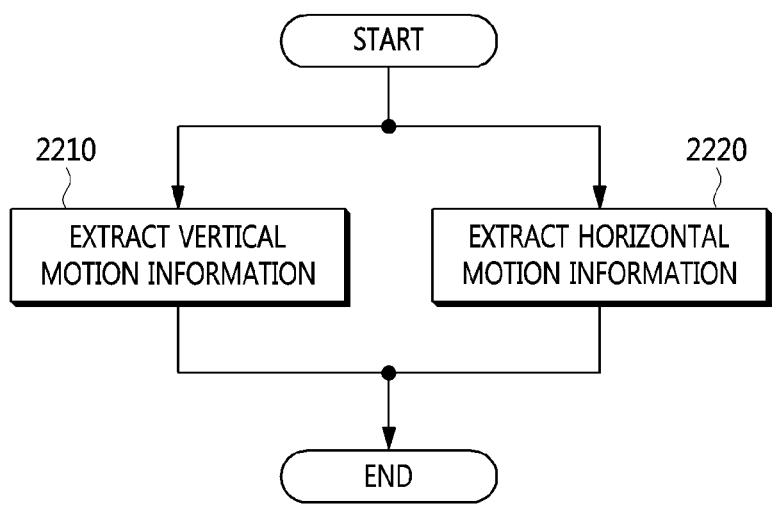
FIG. 22 is a flowchart of temporal feature information extraction according to an example.

FIG. 22 is a flowchart of temporal feature information extraction according to an example.

Step 520, described above with reference to FIG. 5, may include steps 2210 and 2220.

At step 2210, the vertical motion information extraction unit 2110 may extract vertical motion information of temporal feature information from multiple images of an input video.

In accordance with the characteristics of human perception, a person may be sensitive to sudden motion between frames. In order to take into consideration such perceptual characteristics, the vertical motion information extraction unit 2110 may extract the vertical motion information, as represented by the following Equation (14):

$$T_x(i, j, t) = \left(3.172 \times \frac{1}{R} - 0.016\right) \times v_x(i, j, t) - 1.87 \times \frac{1}{R} - 0.027 \quad (14)$$

$v_x(i, j, t)$ denotes the speed of motion in an x-axis direction. R denotes a frame rate per second. Here, R may be $1/\Delta t$.

Equation (14) causes judder distortion, which is a perceptual feature, to be reflected in a motion vector. The vertical motion information extraction unit 2110 may cause judder distortion, which is the perceptual feature, to be reflected in the motion information by extracting the motion information based on Equation (14).

At step 2220, the horizontal motion information extraction unit 2120 may extract horizontal motion information of temporal feature information from multiple images of an input video.

The horizontal motion information extraction unit 2120 may extract the horizontal motion information by substituting the speed of motion in a y-axis direction into the above-described Equation (14).

Figure 23:
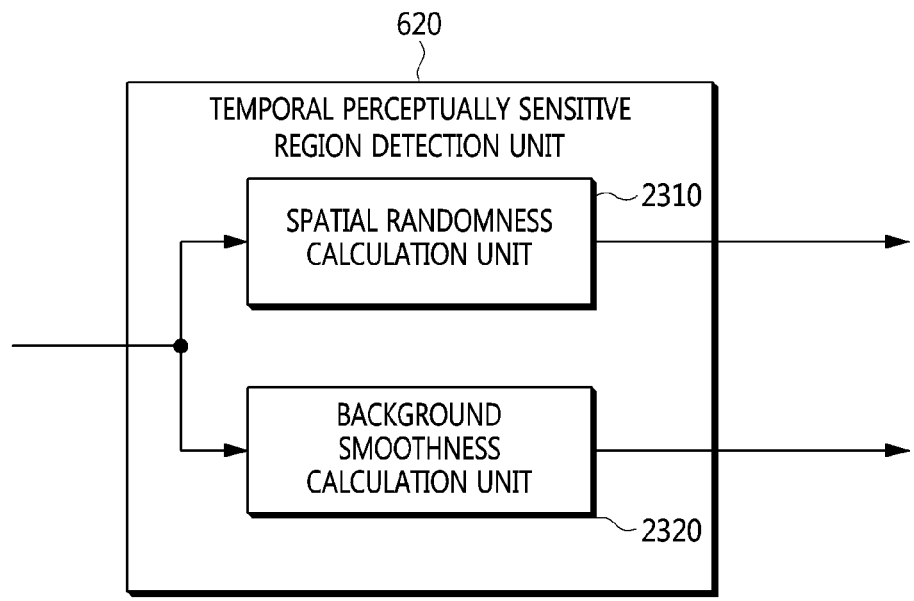
FIG. 23 illustrates the structure of a temporal perceptually sensitive region detection unit according to an example.

FIG. 23 illustrates the structure of a temporal perceptually sensitive region detection unit according to an example.

The temporal perceptually sensitive region detection unit 620 may include a spatial randomness calculation unit 2310 and a background smoothness calculation unit 2320.

The functions and operations of the spatial randomness calculation unit 2310 and the background smoothness calculation unit 2320 will be described in detail below.

Figure 24:
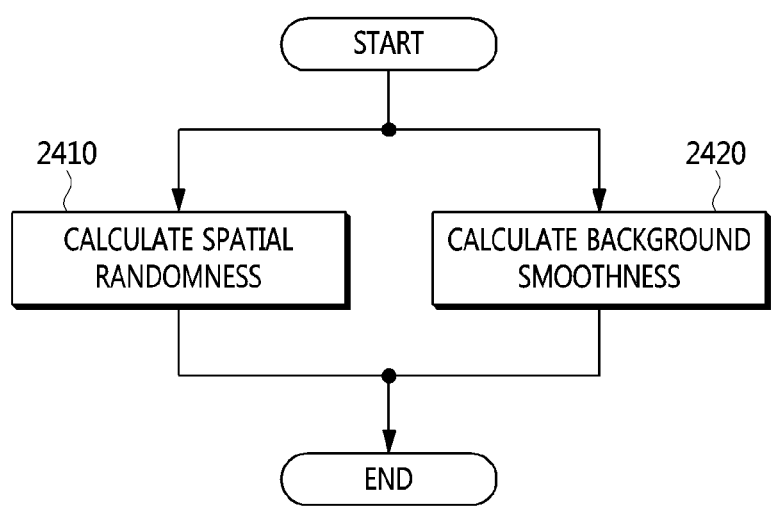
FIG. 24 is a flowchart of temporal perceptually sensitive region detection according to an example.

FIG. 24 is a flowchart of temporal perceptually sensitive region detection according to an example.

Step 720, described above with reference to FIG. 7, may include steps 2410 and 2420.

The temporal perceptually sensitive region detection unit 620 may detect a temporal perceptually sensitive region in a GOP. The GOP may be composed of two images, corresponding to the previous image and the current image.

At step 2410, the spatial randomness calculation unit 2310 may calculate spatial randomness for the current image in the GOP of an input video.

Here, a scheme in which the spatial randomness calculation unit 1610 of the above-described spatial perceptually sensitive region detection unit 610 calculates spatial randomness may also be used in the spatial randomness calculation unit 2310.

Alternatively, the spatial randomness calculation unit 2310 may calculate spatial randomness for the previous image in the GOP of the input video.

Alternatively, the spatial randomness calculation unit 2310 may calculate spatial randomness for the weighted average of the current image and the previous image in the GOP of the input video.

At step 2420, the background smoothness calculation unit 2320 may calculate background smoothness for the current image in the GOP of the input video.

Here, a scheme in which the background smoothness calculation unit 1620 of the above-described spatial perceptually sensitive region detection unit 610 calculates background smoothness may also be used in the background smoothness calculation unit 2320.

Alternatively, the background smoothness calculation unit 2320 may calculate background smoothness for the previous image in the GOP of the input video.

Alternatively, the background smoothness calculation unit 2320 may calculate background smoothness for the weighted average of the current image and the previous image in the GOP of the input video.

Figure 25:
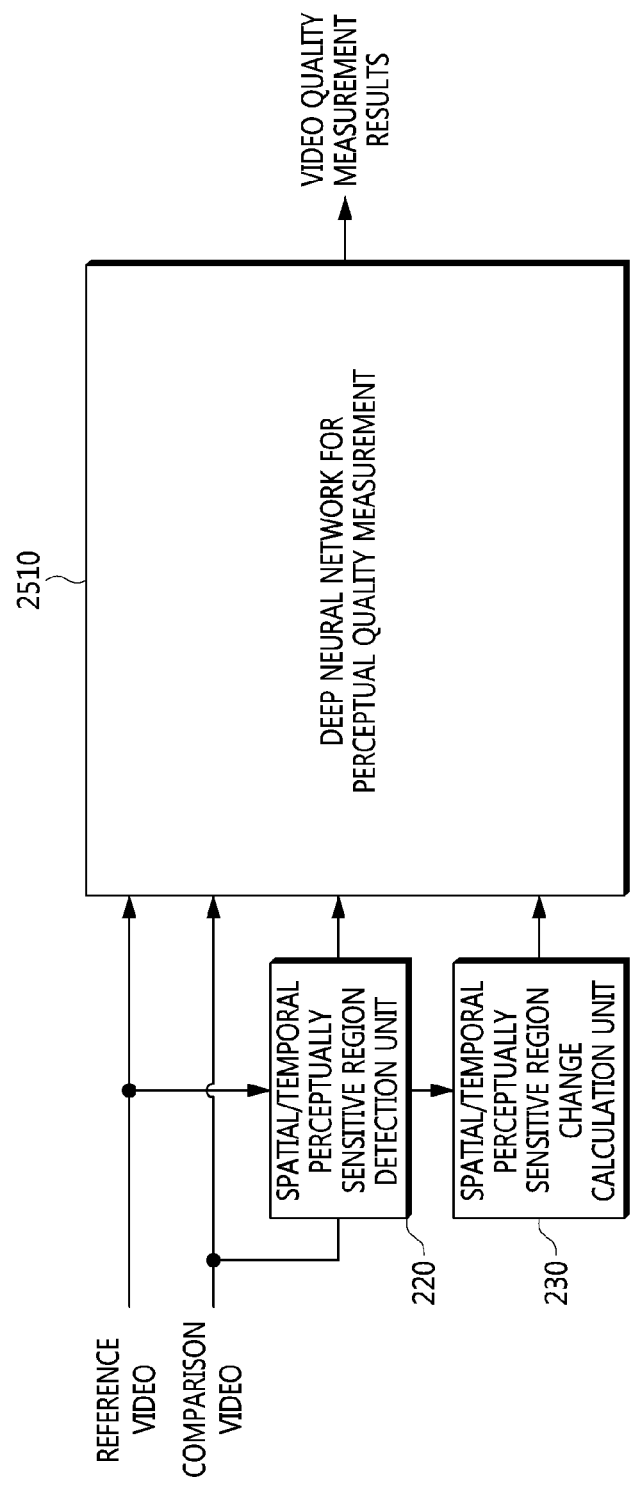
FIG. 25 illustrates a configuration for measuring video quality using a deep neural network for perceptual quality measurement according to an embodiment.

FIG. 25 illustrates a configuration for measuring video quality using a deep neural network for perceptual quality measurement according to an embodiment.

The spatial/temporal feature information extraction unit 210, the distortion calculation unit 240, and the index calculation unit 250, which are described above with reference to FIG. 2, may be replaced with a perceptual quality measurement deep neural network 2510. The processing unit 210 may operate the perceptual quality measurement deep neural network 2510.

Instead of the foregoing units, described above with reference to FIG. 2, perceptual quality of a comparison video may be measured by the perceptual quality measurement deep neural network 2510. In this case, a reference video and a comparison video may be input to the perceptual quality measurement deep neural network 2510, and 1) the spatial/temporal perceptually sensitive region of the reference video, 2) the spatial/temporal perceptually sensitive region of the comparison video, and 3) the change from the spatial/temporal perceptually sensitive region of the reference video to the spatial/temporal perceptually sensitive region of the comparison video may also be input thereto.

That is, when the perceptual quality measurement deep neural network 2510 measures perceptual quality, information for measurement of perceptual quality is not autonomously generated in the perceptual quality measurement deep neural network 2510 to which the reference video and the comparison video are input, but may be provided by the spatial/temporal perceptually sensitive region detection unit 220 and the spatial/temporal perceptually sensitive region change calculation unit 230 described in the embodiments.

Since the required information is externally input, the perceptual quality measurement deep neural network 2510 may more desirably learn perceptual features related to the reference video and the comparison video during a learning process in the deep neural network, and may provide higher measurement reliability when assessing perceptual quality after learning is terminated.

The function and operation of the perceptual quality measurement deep neural network 2510 will be described in detail below.

Figure 26:
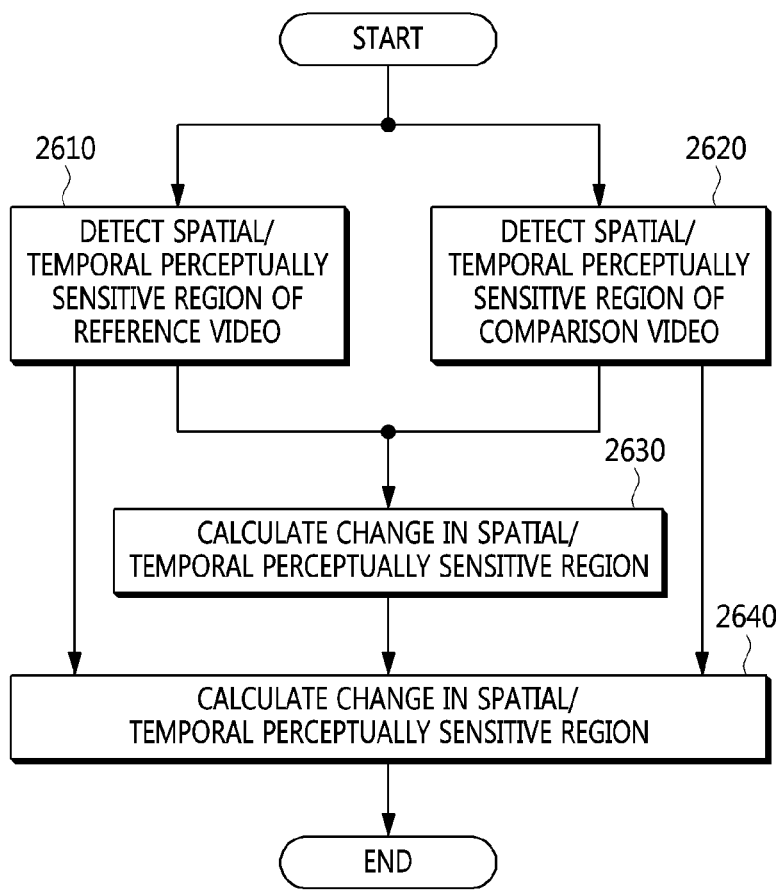
FIG. 26 is a flowchart of a method for measuring video quality using a deep neural network for perceptual quality measurement according to an embodiment.

FIG. 26 is a flowchart of a method for measuring video quality using a deep neural network for perceptual quality measurement according to an embodiment.

Step 2610 may correspond to step 320, described above with reference to FIG. 3. Repetitive descriptions will be omitted here.

Step 2620 may correspond to step 340, described above with reference to FIG. 3. Repetitive descriptions will be omitted here.

Step 2630 may correspond to step 350, described above with reference to FIG. 3. Repetitive descriptions will be omitted here.

At step 2640, 1) a reference video, 2) a comparison video, 3) the spatial/temporal perceptually sensitive region of the reference video, 4) the spatial/temporal perceptually sensitive region of the comparison video, and 5) the change from the spatial/temporal perceptually sensitive region of the reference video to the spatial/temporal perceptually sensitive region of the comparison video may be input to the perceptual quality measurement deep neural network 2510.

The perceptual quality measurement deep neural network 2510 may generate the results of measurement of video quality using 1) the reference video, 2) the comparison video, 3) the spatial/temporal perceptually sensitive region of the reference video, 4) the spatial/temporal perceptually sensitive region of the comparison video, and 5) the change from the spatial/temporal perceptually sensitive region of the reference video to the spatial/temporal perceptually sensitive region of the comparison video.

The apparatus (device) described herein may be implemented using hardware components, software components, or a combination thereof. For example, the apparatus (device) and components described in embodiments may be implemented using one or more general-purpose or special-purpose computers, such as, for example, a processor, a controller and an Arithmetic Logic Unit (ALU), a digital signal processor, a microcomputer, a Field-Programmable Array (FPA), a Programmable Logic Unit (PLU), a microprocessor or any other device capable of responding to and executing instructions in a defined manner. A processing device may run an Operating System (OS) and one or more software applications that run on the OS. The processing device may also access, store, manipulate, process, and create data in response to execution of the software. For the purpose of simplicity, the description of a processing device is made in the singular; however, those skilled in the art will appreciated that a processing device may include multiple processing components and multiple types of processing components. For example, a processing device may include multiple processors or a processor and a controller. In addition, different processing configurations are possible, such as configurations including parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. In particular, the software and data may be stored in one or more computer-readable storage media.

The method according to embodiments may be implemented in the form of program instructions that can be executed through various types of computer means, and may be stored in computer-readable storage media.

The computer-readable storage media may include information used in the embodiments of the present disclosure. For example, the computer-readable storage media may include a bitstream, and the bitstream may include the information described in the embodiments of the present disclosure.

The computer-readable storage media may include non-transitory computer-readable media.

The computer-readable media may also include, alone or in combination with the program instructions, data files, data structures, and the like. The program instructions recorded on the media may be those specially designed and constructed for the purposes of the example embodiments, or may be of a kind well-known and available to those having skill in the computer software arts. Examples of the computer-readable storage media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), and flash memory. Examples of program instructions include both machine language code, such as that produced by a compiler, and files containing higher-level language code to be executable by the computer using an interpreter. The above-described hardware device may be configured to act as one or more software modules in order to perform operations in the above-described example embodiments, or vice versa.

There are provided a method and apparatus for measuring the quality of a video based on a perceptually sensitive region.

There are provided a method and apparatus for measuring the quality of a video based on a change in a perceptually sensitive region.

There are provided a method and apparatus for deriving the feature information of an image using perceptual weights.

Although exemplary embodiments have been illustrated and described above with reference to limited embodiments and drawings, it will be appreciated by those skilled in the art that various changes and modifications may be made in these exemplary embodiments without departing from the principles and spirit of the disclosure. For example, desired results can be achieved even if the described techniques are performed in an order different from that of the described methods and/or even if the components, such as the described system, architecture, device, and circuit, are coupled or combined in a form different from that of the described methods or are substituted or replaced by other components or equivalents thereof.

What is claimed is:

1. A video-processing apparatus, comprising:
a transceiver for receiving a reference video and a comparison video; and a
processor for generating a result of video quality measurement for the comparison video,
wherein the processor calculates distortion using feature information of the reference video, feature information of the comparison video, a perceptually sensitive region of the reference video, a perceptually sensitive region of the comparison video, and a change from the perceptually sensitive region of the reference video to the perceptually sensitive region of the comparison video, and generates the result of the video quality measurement based on the distortion, and
the perceptually sensitive region of the reference video includes one or more of a spatial perceptually sensitive region of the reference video, a temporal perceptually sensitive region of the reference video, and a spatial-temporal perceptually sensitive region of the reference video,
the perceptually sensitive region of the comparison video includes one or more of a spatial perceptually sensitive region of the comparison video, a temporal perceptually sensitive region of the comparison video, and a spatial-temporal perceptually sensitive region of the comparison video,
the processor generates a spatial randomness map by calculating spatial randomness values of a first block in each image of an input video,
the input video is the reference video or the comparison video,
the processor generates a smoothness map by calculating a background smoothness value of a second block in each image of the input video,
a pixel of the spatial randomness map corresponds to the first block,
the pixel corresponding to the first block is predicted using third blocks adjacent to the first block,
a value of the pixel is calculated using a cross-correlation matrix of the third blocks and the first block and an inverse matrix of a correlation matrix of the third blocks, and
the background smoothness value is the number of pixels of which spatial randomness is lower than a threshold in the second block divided by the number of pixels in the second block.

2. The video-processing apparatus of claim 1, wherein:
the feature information of the reference video includes one or more of spatial feature information of the reference video, temporal feature information of the reference video, and spatial-temporal feature information of the reference video, and
the feature information of the comparison video includes one or more of spatial feature information of the comparison video, temporal feature information of the comparison video, and spatial-temporal feature information of the comparison video.

3. The video-processing apparatus of claim 2, wherein:
the processor extracts the spatial-temporal feature information from a spatial-temporal slice of an input video,
the input video includes one or more of the reference video and the comparison video, and
the spatial-temporal slice has a structure into which a Group of Pictures (GOP) of the input video is spatially divided.

4. The video-processing apparatus of claim 2, wherein:
the processor detects horizontal features and vertical features of the spatial feature information in each image of an input video, and
the processor detects features in a direction other than a horizontal direction and a vertical direction in the image.

5. The video-processing apparatus of claim 4, wherein the processor derives a region in which perceptual sensitivity is high from the image using an edge detection method.

6. The video-processing apparatus of claim 5, wherein the edge detection method is a method using a Sobel operation.

7. The video-processing apparatus of claim 5, wherein:
the horizontal features and the vertical features indicate a horizontal-vertical edge map, and the features in the direction other than the horizontal direction and the vertical direction indicate an edge map from which information about a horizontal edge and a vertical edge is excluded.

8. The video-processing apparatus of claim 7, wherein:
the processor updates the horizontal-vertical edge map using a first perceptual weight, and
the processor updates the edge map from which the information about the horizontal edge and the vertical edge is excluded using a second perceptual weight.

9. The video-processing apparatus of claim 8, wherein the first perceptual weight and the second perceptual weight reflect a change in a spatial perceptually sensitive region.

10. The video-processing apparatus of claim 1, wherein the change is a difference between the perceptually sensitive region of the reference video and the perceptually sensitive region of the comparison video.

11. The video-processing apparatus of claim 10, wherein the distortion includes one or more of spatial distortion, temporal distortion, and spatial-temporal distortion.

12. The video-processing apparatus of claim 11, wherein:
the processor extracts representative spatial information of the reference video using spatial feature information of the reference video, a spatial perceptually sensitive region of the reference video, and a change in the spatial perceptually sensitive region,
the processor extracts representative spatial information of the comparison video using spatial feature information of the comparison video, a spatial perceptually sensitive region of the comparison video, and a change in the spatial perceptually sensitive region,
the processor calculates the spatial distortion, the spatial distortion is a difference between the representative spatial information of the reference video and the representative spatial information of the comparison video, and
the change in the spatial perceptually sensitive region is a change from the spatial perceptually sensitive region of the reference video to the spatial perceptually sensitive region of the comparison video.

13. The video-processing apparatus of claim 12, wherein:
the processor generates combined spatial information of the reference video by combining the spatial feature information of the reference video, the spatial perceptually sensitive region of the reference video, and the change in the spatial perceptually sensitive region,
the processor extracts representative spatial information of each image of the reference video from the combined spatial information, and the processor extracts the representative spatial information of the reference video from the representative spatial information of each image of the reference video.

14. The video-processing apparatus of claim 11, wherein:
the processor extracts representative temporal information of the reference video using temporal feature information of the reference video, a temporal perceptually sensitive region of the reference video, and a change in the temporal perceptually sensitive region,
the processor extracts the representative temporal information of the comparison video using temporal feature information of the comparison video, a temporal perceptually sensitive region of the comparison video, and a change in the temporal perceptually sensitive region,
the processor calculates the temporal distortion, the temporal distortion is a difference between the representative temporal information of the reference video and the representative temporal information of the comparison video, and the change in the temporal perceptually sensitive region is a change from a temporal perceptually sensitive region of the reference video to a temporal perceptually sensitive region of the comparison video.

15. The video-processing apparatus of claim 14, wherein:
the processor generates combined temporal information of the reference video by combining the temporal feature information of the reference video, the temporal perceptually sensitive region of the reference video, and the change in the temporal perceptually sensitive region,
the processor extracts representative temporal information of each image of the reference video from the combined temporal information, and
the processor extracts the representative temporal information of the reference video from the representative temporal information of each image of the reference video.

16. A video-processing method, comprising:
extracting feature information of a reference video;
detecting a perceptually sensitive region of the reference video;
extracting feature information of a comparison video;
detecting a perceptually sensitive region of the comparison video;
calculating a change from the perceptually sensitive region of the reference video to the perceptually sensitive region of the comparison video;
calculating distortion using the feature information of the reference video, the feature information of the comparison video, the perceptually sensitive region of the reference video, the perceptually sensitive region of the comparison video, and the change;
generating a result of video quality measurement based on the distortion, wherein
the perceptually sensitive region of the reference video includes one or more of a spatial perceptually sensitive region of the reference video, a temporal perceptually sensitive region of the reference video, and a spatial-temporal perceptually sensitive region of the reference video,
the perceptually sensitive region of the comparison video includes one or more of a spatial perceptually sensitive region of the comparison video, a temporal perceptually sensitive region of the comparison video, and a spatial-temporal perceptually sensitive region of the comparison video,
a spatial randomness map is generated by calculating spatial randomness values of a first block in each image of an input video,
the input video is the reference video or the comparison video,
a smoothness map is generated by calculating a background smoothness value of a second block in each image of the input video,
a pixel of the spatial randomness map corresponds to the first block, the pixel corresponding to the first block is predicted using third blocks adjacent to the first block,
a value of the pixel is calculated using a cross-correlation matrix of the third blocks and the first block and an inverse matrix of a correlation matrix of the third blocks, and
the background smoothness value is the number of pixels of which spatial randomness is lower than a threshold in the second block divided by the number of pixels in the second block.

17. A non-transitory computer-readable storage medium storing a program for performing the video-processing method of claim 16.

* * * * *